United States Patent
Namihira et al.

(10) Patent No.: US 10,372,485 B2
(45) Date of Patent: Aug. 6, 2019

(54) INFORMATION PROCESSING SYSTEM, INFORMATION PROCESSING APPARATUS, METHOD FOR PROCESSING INFORMATION, AND RECORDING MEDIUM

(71) Applicants: Kohsuke Namihira, Kanagawa (JP); Yuuichiroh Hayashi, Kanagawa (JP); Kazunori Sugimura, Kanagawa (JP); Hikaru Kominami, Kanagawa (JP); Zhi Min, Tokyo (JP); Dongzhe Zhang, Kanagawa (JP); Ryutaro Sakanashi, Kanagawa (JP)

(72) Inventors: Kohsuke Namihira, Kanagawa (JP); Yuuichiroh Hayashi, Kanagawa (JP); Kazunori Sugimura, Kanagawa (JP); Hikaru Kominami, Kanagawa (JP); Zhi Min, Tokyo (JP); Dongzhe Zhang, Kanagawa (JP); Ryutaro Sakanashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 15/292,238

(22) Filed: Oct. 13, 2016

(65) Prior Publication Data
US 2017/0109194 A1    Apr. 20, 2017

(30) Foreign Application Priority Data

Oct. 14, 2015 (JP) ................ 2015-202938
Jul. 27, 2016 (JP) ................ 2016-147244

(51) Int. Cl.
G06F 9/48 (2006.01)
G06F 9/50 (2006.01)
G06F 9/455 (2018.01)

(52) U.S. Cl.
CPC ............ *G06F 9/48* (2013.01); *G06F 9/45512* (2013.01); *G06F 9/4881* (2013.01); *G06F 9/50* (2013.01)

(58) Field of Classification Search
None
See application file for complete search history.

(56) References Cited

U.S. PATENT DOCUMENTS

| 7,382,479 B2 | 6/2008 | Hirose et al. |
| 9,124,733 B2 | 9/2015 | Ando |

(Continued)

FOREIGN PATENT DOCUMENTS

| JP | 2004-151893 | 5/2004 |
| JP | 2014-032659 | 2/2014 |
| JP | 2016-154000 | 8/2016 |

OTHER PUBLICATIONS

Extended European Search Report for 16192654.8 dated Mar. 17, 2017.

*Primary Examiner* — Wynuel S Aquino
*Assistant Examiner* — Melissa A Headly
(74) *Attorney, Agent, or Firm* — Ipusa, PLLC

(57) ABSTRACT

An information processing system that includes at least one information processing apparatus and executes programs, each of which performs a predetermined process, the information processing system including a memory unit configured to store, for each of applications performing a sequence of processes using electronic data, program identification information identifying at least one program performing each process of the sequence of processes, flow information defining an execution order of the at least one program, and app identification information identifying each of the applications, while associating the program identification information, the flow information, and the app identification information, a registering unit, and a process executing unit, (Continued)

in receipt of a request including information related to the electronic data and the app identification information from a second apparatus, configured to cause the program identified by the program identification information in accordance with the execution order defined in the flow information.

6 Claims, 28 Drawing Sheets

(56) References Cited

U.S. PATENT DOCUMENTS

| | | |
|---|---|---|
| 2012/0117570 A1* | 5/2012 | Ozaki .................... G06Q 10/06 718/102 |
| 2012/0154842 A1 | 6/2012 | Hori |
| 2013/0152041 A1 | 6/2013 | Hatfield et al. |
| 2014/0282569 A1 | 9/2014 | Kamimoto |
| 2015/0170088 A1 | 6/2015 | Rizk et al. |
| 2015/0261391 A1 | 9/2015 | Herlitz et al. |
| 2016/0241724 A1 | 8/2016 | Sugimura et al. |

\* cited by examiner

FIG.5A

| COMMON I/F OF FILE PROCESSING UNIT | |
|---|---|
| COMMON I/F | SUMMARY |
| /EXTERNAL STORAGE NAME/process/file | ACQUIRING FILE FROM DESIGNATED EXTERNAL STORAGE |
| /EXTERNAL STORAGE NAME /process/folder | STORING FILE IN DESIGNATED EXTERNAL STORAGE |
| ... | ... |

FIG.5B

| UNIQUE I/F OF FILE PROCESSING UNIT | |
|---|---|
| UNIQUE I/F | SUMMARY |
| /EXTERNAL STORAGE NAME /process/extension/attach | ADDING FILE TO DOCUMENT STORED IN DESIGNATED EXTERNAL STORAGE |
| ... | ... |

FIG.5C

| COMMON I/F OF DATA PROCESSING UNIT | |
|---|---|
| COMMON I/F | SUMMARY |
| /EXTERNAL STORAGE NAME/data/files | ACQUIRING FILE VIEW FROM DESIGNATED EXTERNAL STORAGE |
| /EXTERNAL STORAGE NAME/data/folders | ACQUIRING FOLDER VIEW FROM DESIGNATED EXTERNAL STORAGE |
| ... | ... |

FIG.5D

| UNIQUE I/F OF DATA PROCESSING UNIT | |
|---|---|
| UNIQUE I/F | SUMMARY |
| /EXTERNAL STORAGE NAME /data/extension/images | ACQUIRING IMAGE FILE VIEW FROM DESIGNATED EXTERNAL STORAGE |
| ... | ... |

FIG.7

| COMPONENT NAME | COMPONENT ID | OPERATION NAME | OPERATION ID | PARAMETER |
|---|---|---|---|---|
| EXTERNAL STORAGE A COMPONENT | storageA | DELIVERY | uploadFile | folderId |
| | | ACQUISITION | getFiles | fileId |
| EXTERNAL STORAGE B COMPONENT | storageB | DELIVERY | uploadFile | folderId |
| | | ACQUISITION | getFiles | fileId |
| OCR COMPONENT | ocr | OCR | process | language outputType |
| PRINT CONVERSION COMPONENT | conv | PRINT CONVERSION | process | outputType |
| ... | ... | ... | ... | ... |

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

```
{
  "flowId" : "flow001",              }1201A
  "flowName" : "OCR DELIVERY 1",     }1202A
                                                    1203A
  "flowDetails" : [
      {
          "component" : "ocr",
          "operation" : "process",
          "parameters" : {
              "language" : "English",                 }1213A
              "outputType" : "pdf"
          }
      },
      {
          "component" : "storageA",
          "operation" : "uploadFile",
          "parameters" : {                            }1223A
              "folderId" : " "
          }
      }
  ]
}
```

1200A

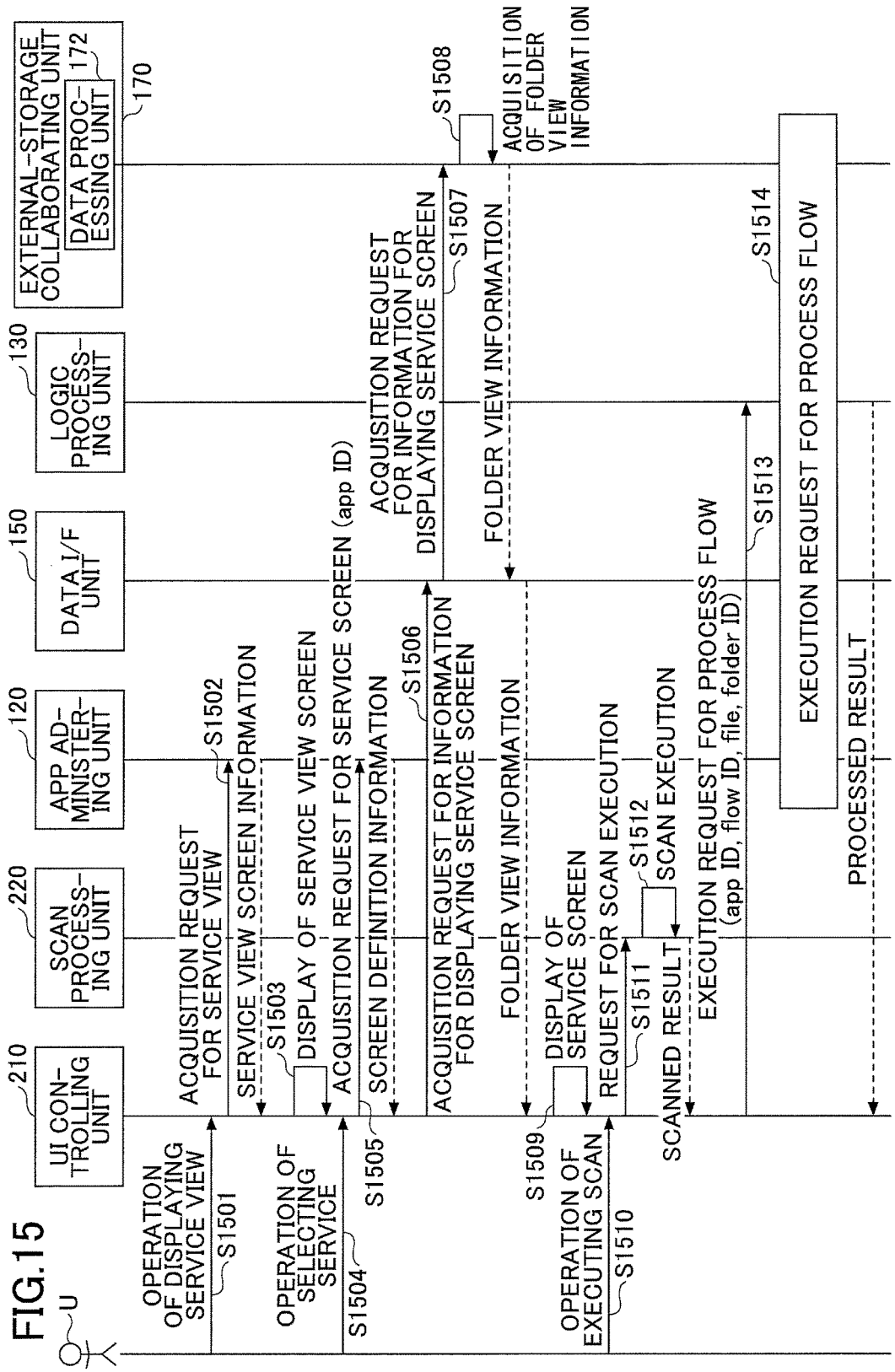

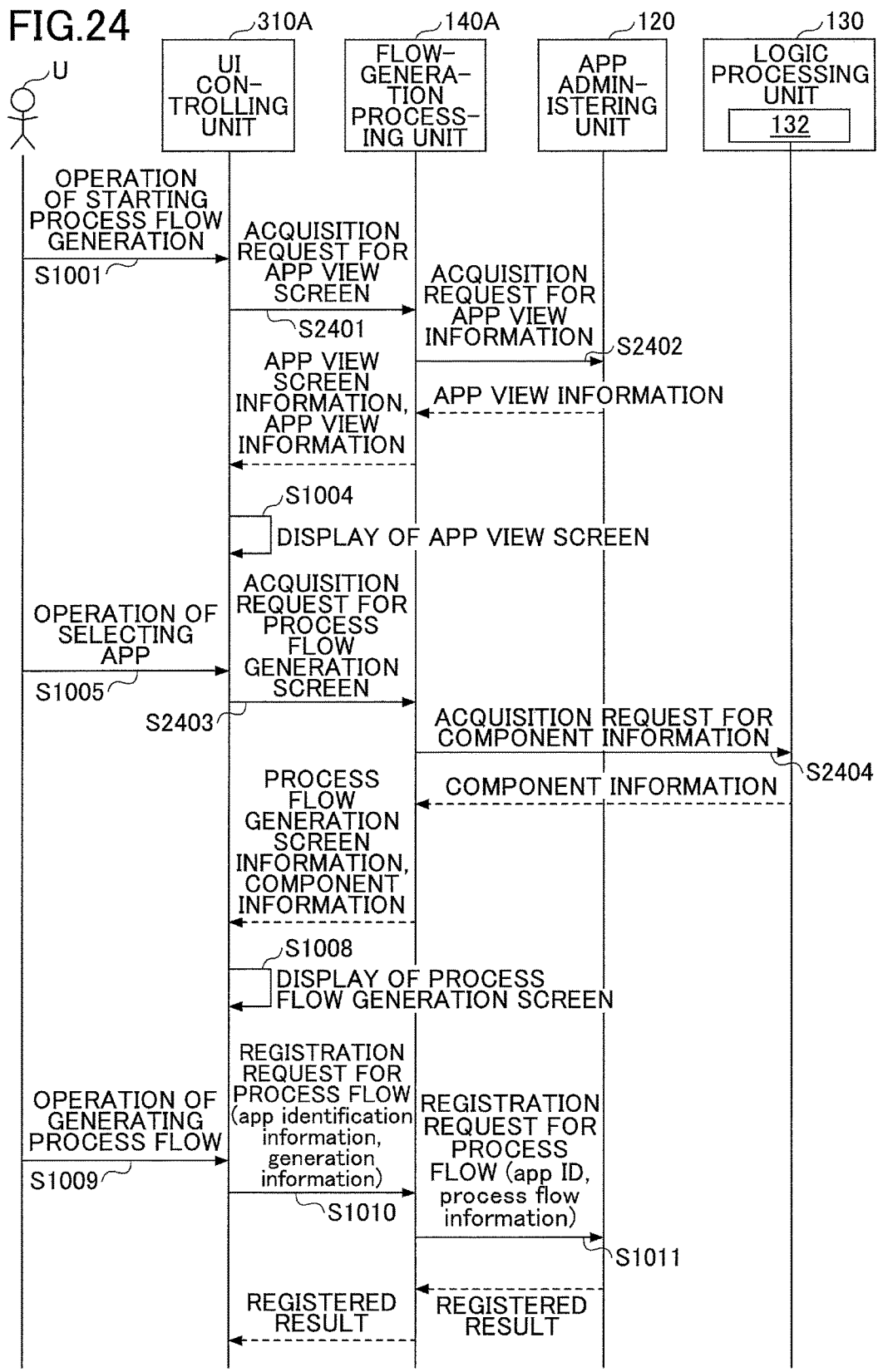

INFORMATION PROCESSING SYSTEM, INFORMATION PROCESSING APPARATUS, METHOD FOR PROCESSING INFORMATION, AND RECORDING MEDIUM

CROSS-REFERENCE TO RELATED APPLICATIONS

The present application claims priority under 35 U.S.C. § 119 to Japanese Patent Application No. 2015-202938, filed Oct. 14, 2015 and Japanese Patent Application No. 2016-147244, filed Jul. 27, 2016. The contents of which are incorporated herein by reference in their entirety.

BACKGROUND OF THE INVENTION

Field of the Invention

The present invention relates to an information processing system, an information processing apparatus, a method for processing information, and a recording medium.

Description of the Related Art

In recent years, various external services are provided by cloud computing or the like. For example, there is known an external service, in which electronic data designated by a user are stored in an external storage, or the like.

For example, there is a technique of storing image data, which are acquired by scanning an original using an image forming apparatus, in an external storage (for example, Japanese Unexamined Patent Application Publication No. 2014-032659). As described, there is a technique in which the image forming apparatus and the external service collaborate to process.

SUMMARY OF THE INVENTION

According to an aspect of an embodiment of the present invention, there is provided an information processing system including at least one information processing apparatus and executing a plurality of programs, each of which performs a predetermined process. This information processing system includes a memory unit configured to store, for each of applications performing a sequence of processes using electronic data, program identification information identifying at least one program, which is from among the plurality of programs and performs each process of the sequence of processes, flow information defining an execution order of the at least one program, and app identification information identifying each of the applications, while associating the program identification information, the flow information, and the app identification information, a registering unit, in response to generation of flow information of the sequence of processes to be executed by a selected application selected by a user from among the applications on a first screen displayed in a first apparatus from among the at least one apparatus coupled to the information processing system using the program identification information and a user operation for defining the execution order, configured to cause the generated flow information and the app identification information for identifying the selected application to be stored in the memory unit while associating the generated flow information and the app identification information, and a process executing unit, in receipt of a request including information related to the electronic data used for the sequence of processes and the app identification information from a second apparatus from among the at least one apparatus, configured to cause the program identified by the program identification information defined in the flow information in accordance with the execution order defined in the flow information to perform the sequence of processes based on the information related to the electronic data.

BRIEF DESCRIPTION OF THE DRAWINGS

FIGS. 5A to 5D illustrate an exemplary common interface (I/F) and an exemplary unique I/F;

FIG. 7 illustrates an exemplary component information table;

FIG. 8 illustrates an exemplary type-conversion-information table;

FIG. 9 illustrates an example of meta-information;

FIG. 15 is a sequence chart of an exemplary overall process for a service use of the first embodiment;

FIG. 24 is a sequence chart of an exemplary registration process for a process flow of the fourth embodiment.

DESCRIPTION OF THE EMBODIMENTS

For example, the embodiments of the present invention are provided in consideration of the above, and the object of the embodiments is to support the development of the application for conducting a sequence of processes.

Hereinafter, the embodiment of the present invention is described in detail with reference to figures.

First Embodiment

System Structure

Figure 1:
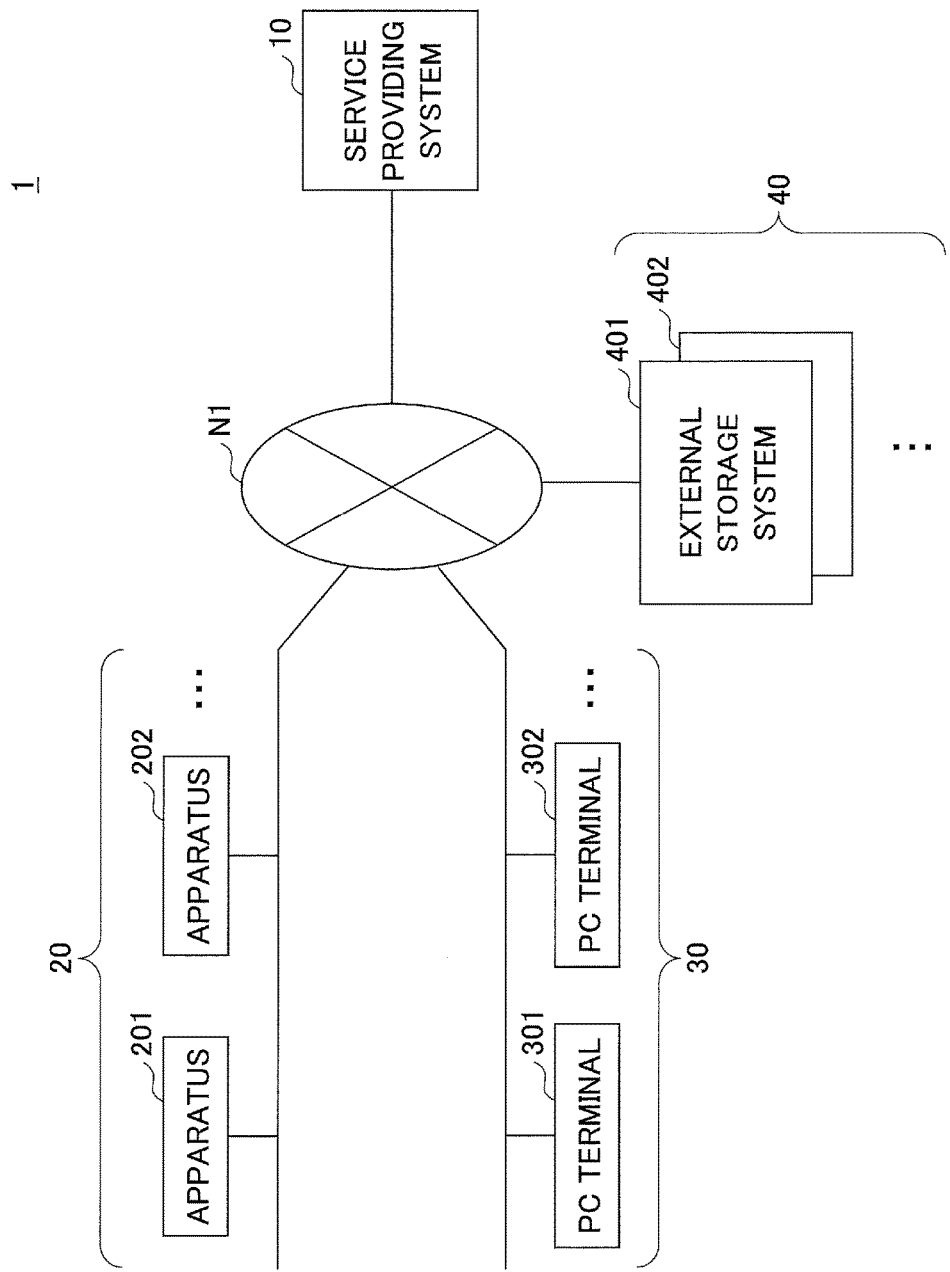
FIG. 1 is a diagram illustrating a system structure of an exemplary information processing system of a first embodiment.

Referring to FIG. 1, an information processing system 1 of the first embodiment is described. FIG. 1 is a diagram illustrating an exemplary system structure of an information processing system 1 of the first embodiment.

The information processing system 1 illustrated in FIG. 1 includes a service providing system 10, an apparatus 20, a personal computer (PC) terminal 30, and an external storage system 40, which are communicably coupled through a wide area network N1 such as the Internet.

The service providing system 10 is substantialized by at least one information processing apparatus and provides various services substantialized by a sequence of processes, which collaborates with the external service such as a cloud service through the network N1.

The service provided by the service providing system 10 of the first embodiment is specifically described later. Hereinafter, the sequence of processes is referred to as a "process flow".

Although the external service is specifically the cloud service in the first embodiment, the external service is not limited to the cloud service. For example, the first embodiment may be applied to various external services such as a service provided by an application service provider (ASP) and a web service, which are provided through the network.

The apparatus 20 is various electronic apparatuses used by a user. Said differently, the apparatus 20 is, for example, an image forming apparatus such as a multifunction peripheral (MFP), a personal computer (PC), a projector, an electronic whiteboard, a digital camera, or the like. The user uses the apparatus 20 to use various services provided by the service providing system 10.

Hereinafter, when each of multiple apparatuses 20 are distinguished, a suffix is added such as an "apparatus 201" and an "apparatus 202".

The PC terminal 30 is, for example, a desktop PC, a notebook PC, a smartphone, a tablet terminal, or the like. The user can use the PC terminal 30 to use various services provided by the service providing system 10.

Hereinafter, when each of multiple PC terminals 30 are distinguished, a suffix is added such as a "PC terminal 301" and a "PC terminal 302".

The external storage system 40 is a computer system providing a cloud service called a storage service or an online storage through the network N1. The storage service is a service of lending a memory area of a storage of the external storage system 40.

Hereinafter, when each of multiple external storage systems 40 is distinguished, a suffix is added such as an "external storage system 401" and an "external storage system 402". Further, the name of the storage service provided by the external storage system 401 is a "storage A", and the name of the storage service provided by the external storage system 402 is a "storage B".

The external storage system 40 may be a system implemented by multiple information processing apparatuses.

The structure of the information processing system 1 illustrated in FIG. 1 is an example and may be another structure. For example, the information processing system 1 of the first embodiment includes various apparatuses, each of which performs at least one of an input and an output of the electronic data. These apparatuses may use various services provided by the service providing system 10.

<Hardware Structure>

Figure 2:
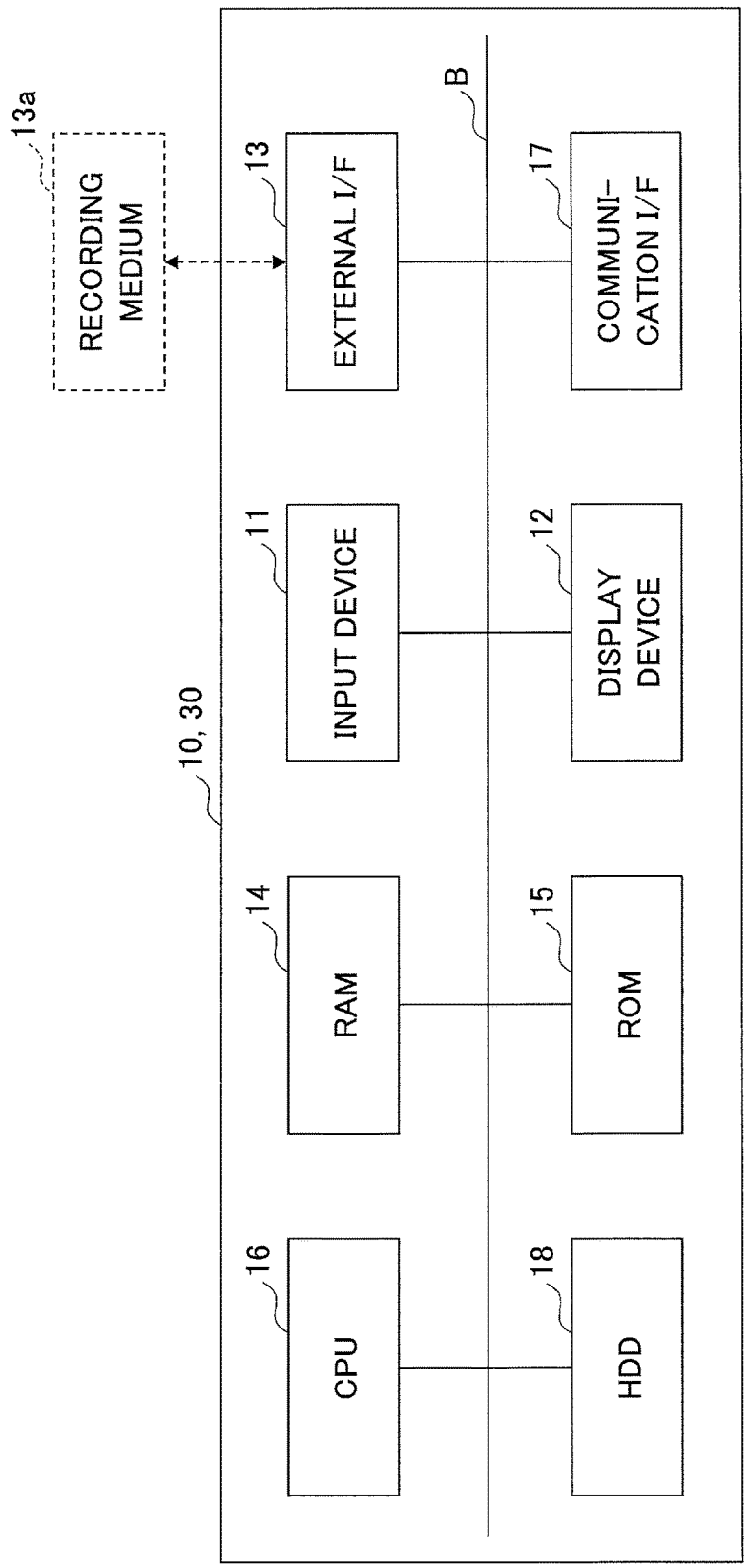
FIG. 2 is a diagram illustrating a hardware structure of an exemplary service providing system and an exemplary PC terminal of the first embodiment.

Referring to FIG. 2, described next is the hardware structure of the service providing system 10 and the PC terminal 30, which are included in the information processing system 1 of the first embodiment. FIG. 2 is a diagram illustrating a hardware structure of an exemplary service providing system 10 and an exemplary PC terminal 30 of the first embodiment. Because the hardware structure of the service providing system 10 and the hardware structure of the PC terminal 30 are similar, the hardware structure of the service providing system 10 is mainly described hereinbelow.

The service providing system 10 illustrated in FIG. 2 includes an input device 11, a display device 12, an external interface (I/F) 13, and a random access memory (RAM) 14. Further, the service providing system 10 includes a read only memory (ROM) 15, a central processing unit (CPU) 16, a communication interface (I/F) 17, and a hard disk drive (HDD) 18. Each of the ROM 15, the CPU 16, a communication I/F 17, and the HDD 18 is connected by the bus B.

The input device 11 includes a keyboard, a mouse, a touch panel, and the like, by which the user inputs various operation signals. The display device 12 includes a display or the like to display a processed result acquired by the service providing system 10. At least one of the input device 11 and the display device 12 may be in a mode of being connected to the service providing system 10 so as to be used.

The communication I/F 17 is an interface provided to couple the service providing system 10 with the network N1. Thus, the service providing system 10 can communicate with another apparatus through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with the external apparatus. The external apparatus is a recording medium 13a or the like. With this, the service providing system 10 can read information from the recording medium 13a and write information to the recording medium 13a through the external I/F 13. The recording medium 13a is a flexible disk, a compact disc (CD), a digital versatile disc (DVD), a secure digital (SD) memory card, a universal serial bus (USB) memory, or the like.

The ROM 15 is a non-volatile semiconductor memory that can store a program or data even when a power source is powered off. The ROM 15 stores a program or data such as a basic input/output system (BIOS), an OS setup, a network setup, or the like, which are executed at a time of starting up the service providing system 10. The RAM 14 is a volatile semiconductor memory configured to temporarily store the programs and the data.

The CPU 16 reads the program and/or data from the memory device such as the ROM 15 and the HDD 18. The read program or the read data undergo a process to thereby substantialize a control or a function of the entire service providing system 10.

The service providing system 10 of this embodiment can substantialize various processes described below by having the above hardware structure of the service providing system 10 illustrated in FIG. 2.

Figure 3:
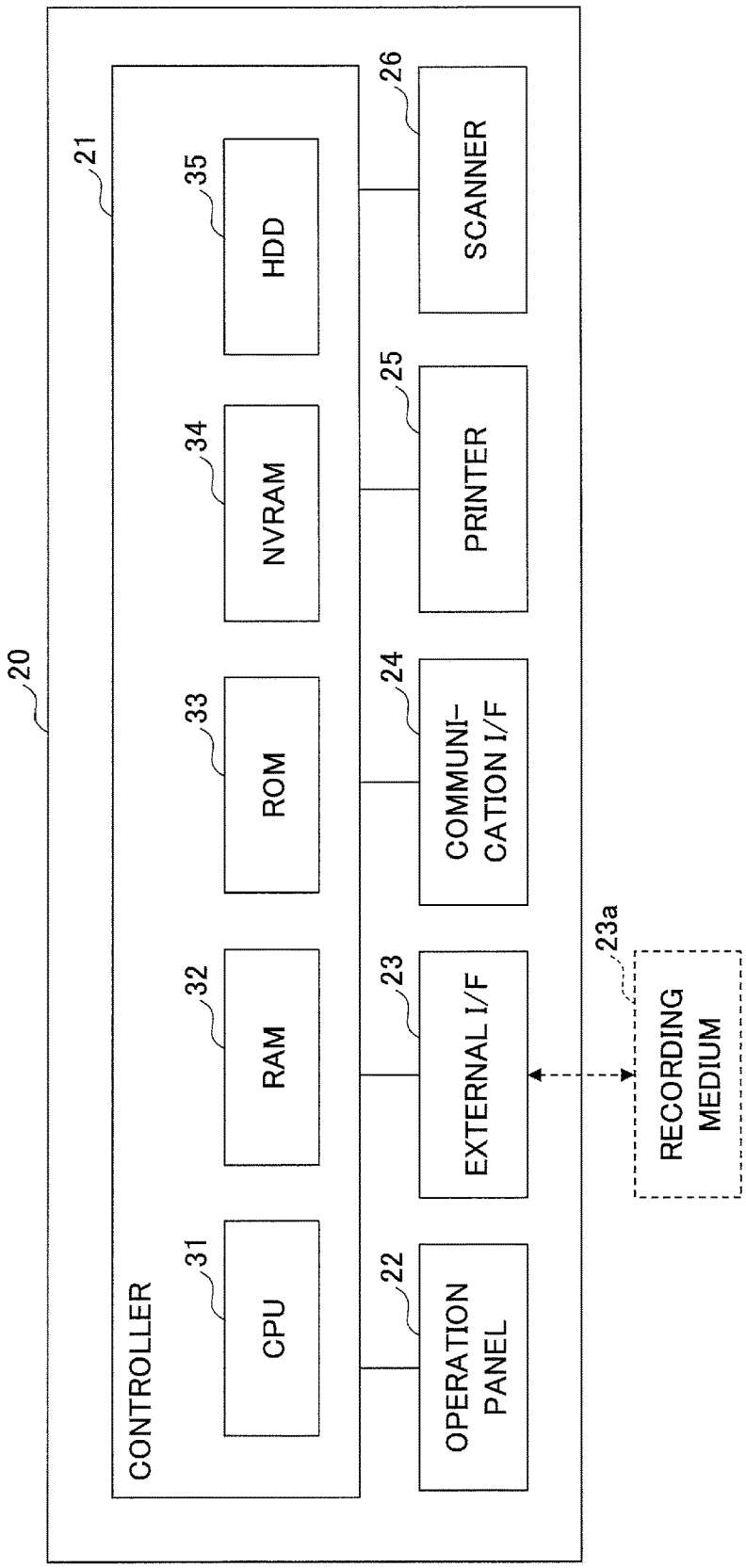
FIG. 3 is a diagram illustrating a hardware structure of an exemplary apparatus of the first embodiment.

Referring to FIG. 3, described next is the hardware structure of an image forming apparatus, which is the apparatus 20 included in the information processing system 1 of the embodiment. FIG. 3 is a diagram illustrating a hardware structure of an exemplary apparatus 20 of the first embodiment.

The apparatus 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and performs the process. Thus, the CPU 31 is an arithmetic device substantializing an entire control or function of the apparatus 20.

The operation panel 22 includes an input unit configured to receive an input from the user and a display unit configured to display. The external I/F 23 is an interface with the external apparatus. The external apparatus is a recording medium 23a or the like. With this, the apparatus 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the apparatus 20 with the network. Thus, the apparatus 20 can perform data communications through the communication I/F 24. The printer 25 is provided to print print data. The scanner 26 is a reading device that reads an original and generates an electronic file (an image file).

The service providing system 20 of the first embodiment includes a hardware structure illustrated in FIG. 3 to substantialize various processes described below.

<Service Provided by Service Providing System>

The service provided by the service providing system 10 of the first embodiment is described later. Hereinafter, description is given for a case where the apparatus 20 is an image forming apparatus.

For example, the service providing system 10 of the first embodiment provides a service (OCR delivery), in which an electronic file generated by scanning the original in the apparatus 20 is subjected to an optical character recognition (OCR) process and stored in the external storage system 40. Further, for example, the service providing system 10 of the first embodiment provides a service (a cloud print service) of printing the electronic file stored in the external storage system 40 by the apparatus 20.

Hereinafter, the description is given for a case where the service providing system 10 provides the above described OCR delivery.

However, the service provided by the service providing system 10 is not limited to this OCR delivery. For example, the service providing system 10 may provide a service of projecting the electronic file stored in the external storage system 40 by the projector. For example, the service providing system 10 may provide a service of providing the OCR process to the electronic file, which is generated by scanning the original using the apparatus 20, thereafter translating to a predetermined language (e.g., translation from English to Japanese), and storing the translated electronic file into the external storage system 40.

<Functional Structure>

Figure 4:
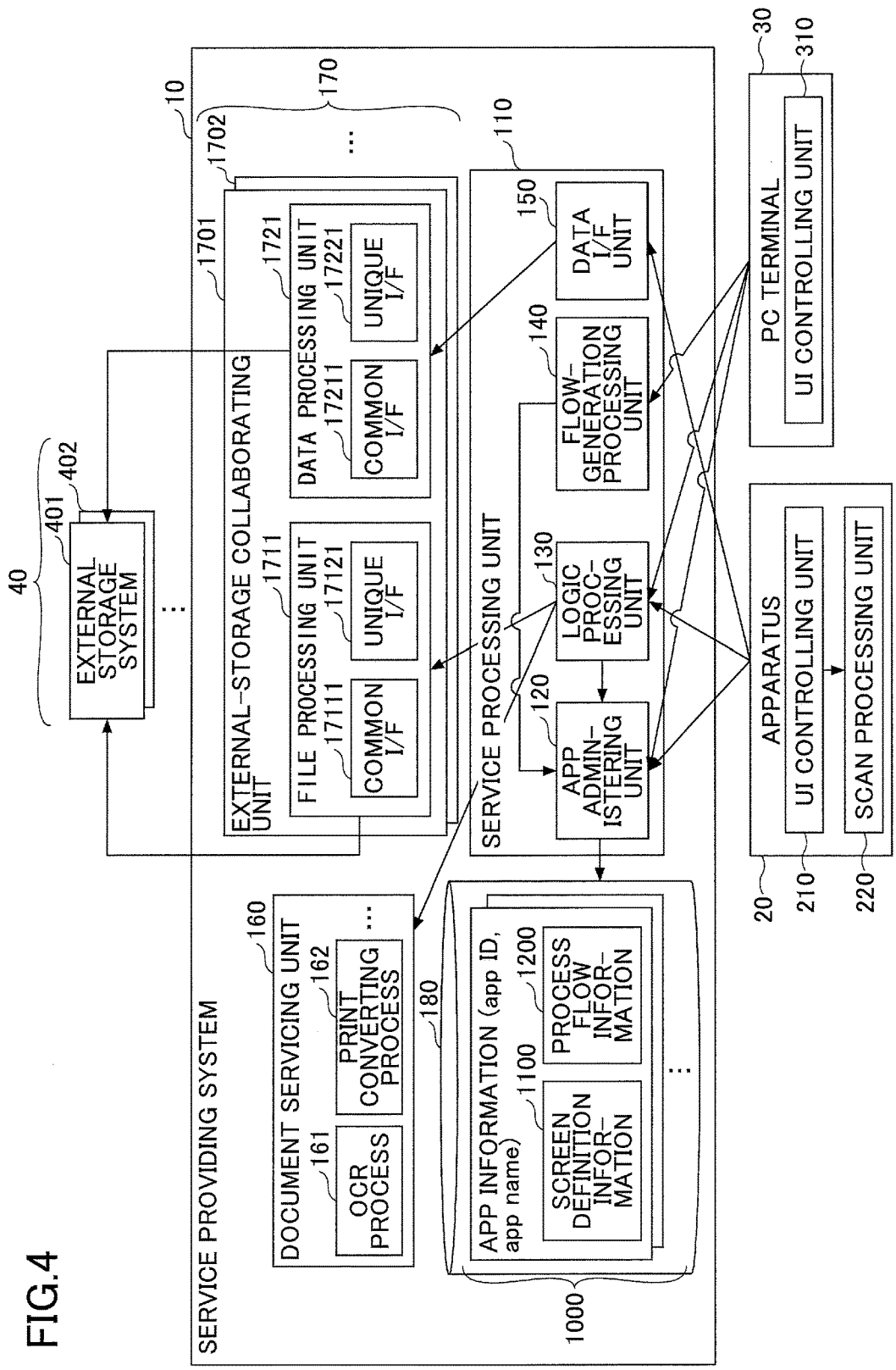
FIG. 4 is a diagram illustrating a functional structure of an exemplary information processing system of a first embodiment.

Referring to FIG. 4, the functional structure of the information processing system 1 of the first embodiment is described. FIG. 4 is a diagram illustrating the functional structure of an exemplary information processing system 1 of the first embodiment.

The apparatus 20 includes an UI controlling unit 210 and a scan processing unit 220. The UI controlling unit 210 and the scan processing unit 220 are substantialized when one or more programs installed in the apparatus 20 causes the CPU 31 to execute a process.

The UI controlling unit 210 causes the operation panel 22 to display various screens. Further, the UI controlling unit 210 receives various operations of the user on various screens displayed on the operation panel 22.

The scan processing unit 220 responds to the operation that is input by the user and received by the UI controlling unit 210 and then scans the original using the scanner 26 to generate the electronic file (the image file).

The PC terminal 30 includes a UI controlling unit 310. This UI controlling unit 310 is substantialized when one or more programs installed in the apparatus 30 causes the CPU 16 to execute a process.

The UI controlling unit 310 causes the display device 12 to display various screens. Further, the UI controlling unit 210 receives various operations input into various screens displayed on the display device 12 through the input device 11 by the user.

The service providing system 10 includes a service processing unit 110, a document servicing unit 160, and an external-storage collaborating unit 170. The service processing unit 110, the document servicing unit 160, and the external-storage collaborating unit 170 are implemented when one or more programs installed on the service providing system 10 are executed by the CPU 16.

Further, the service providing system 10 includes an application information memory unit 180. The application information memory unit 180 may be implemented by using the HDD 18. Further, the application information memory unit 180 may be substantialized by a memory device connected to the service providing system 10 through the network.

The service processing unit 110 conducts a process related to various services provided by the app information 1000 (described below) in response to a request from the UI controlling unit 210 of the apparatus 20. Further, the service processing unit 110 conducts a process related to generation of process flow information 1200 included in the app information 1000 in response to a request from the UI controlling unit 310 of the PC terminal 30.

The process flow information 1200 is information related to a sequence of processes (a process flow) for substantializing a service provided by the app information 1000.

The service processing unit 110 includes an app administering unit 120, a logic processing unit 130, a flow-generation processing unit 140, and a data I/F unit 150.

An app administering unit 120 administers the application information 1000 stored in the app information memory unit 180. The app administering unit 120 returns various information based on the app information 1000 in response to the UI controlling unit 210 of the apparatus 20 and the UI controlling unit 310 of the PC terminal 30.

For example, the app administering unit 120 returns the screen definition information 1100 included in the app information 1000 in response to a request from the UI controlling unit 210 of the apparatus 20. The screen definition information 1100 is information for displaying a service screen which is a screen for using the service provided by the app information 1000.

Further, the app administering unit 120 returns the process content included in the app information 1000 in response to a request from the logic process unit 130. As described above, the process flow information 1200 relates to a sequence of processes substantialized by a service (e.g., OCR delivery) provided by the app information 1000.

The app administering unit 1200 causes the process flow information 1200 generated by the PC terminal to be stored in the app information memory unit 180 in response to a request from the flow-generation processing unit 140.

The logic processing unit 130 acquires the process flow information 1200 included in the app information 1000 through the app administering unit 120 in response to a request from the UI controlling unit 210 of the apparatus 20. The logic processing unit 130 requests the document servicing unit 160, the file processing unit 171 of the external-storage collaborating unit 170, or the like in accordance with the acquired process flow information 1200 to execute the process, and therefore the series of processes are executed in accordance with the process flow information 1200.

The logic processing unit 130 executes a series of processes in accordance with the process flow information 1200 by combining the components described below.

With this, various services provided by the app information 1000 are substantialized by the service providing system 10 of the first embodiment. The logic processing unit 130 is described in detail later.

The flow-generation processing unit 140 returns process flow generation screen information in response to a request from the UI controlling unit 310 of the PC terminal 30. The process flow generation screen information is information for displaying a process flow generation screen, which is a screen for generating the process flow information 1200.

The flow-generation processing unit 140 requests the app administering unit 120 to register the process flow information 1200 indicative of the process flow generated on the process flow generation screen.

Within the first embodiment, the process flow generated in the PC terminal 30 can be registered in the service providing system 10.

The data I/F unit 150 sends various requests (e.g., a request to acquire a folder view) to a data processing unit 172 of the external-storage collaborating unit 170 in response to a request received from the UI controlling unit 210 of the apparatus 20.

The document servicing unit 160 is a program group (a module group) executing various processes. These programs are executed by a component (described below) in response to a request from the logic processing unit 130.

The document servicing unit 160 includes an OCR process 161 of executing an OCR process for the electronic file and a print converting process 162 of converting the electronic file to print data, which the apparatus 20 can print, for example.

The document servicing unit 160 may include various programs such as a program for compressing or decompressing the electronic file, a program for translating the language, or a program for conducting a size conversion of the image file, for example.

The external-storage collaborating unit 170 requests the external storage system 40 to execute various processes (e.g., an acquisition request to acquire the folder view) in response to a request received from the logic processing unit 130 or the data I/F unit 150.

The service providing system 10 includes the external-storage collaborating units 170, which respectively correspond to the external storage systems 40 processing in collaboration with the service providing system 10. Said differently, the service providing system 10 of the first embodiment includes a storage-service A collaborating unit 1701 to send various requests to an external storage system 401. Similarly, the service providing system 10 of the first embodiment includes a storage-service B collaborating unit 1702 to send various requests to the external storage system 402.

Hereinafter, when the multiple external-storage collaborating units 170 are distinguished, individual units are designated by adding a suffix such as the "external-storage A collaborating unit 1701" and the "external-storage B collaborating unit 1702".

The external-storage collaborating unit 170 includes the file processing unit 171 for receiving a request from the logic processing unit 130 and the data processing unit 172 for receiving a request from the data I/F unit 150.

The file processing unit 171 includes a common I/F 1711 and a unique I/F 1712, in which an application programming interface (API) for conducting an operation (e.g., an acquisition, a storage, and an edit) to the electronic file stored in the external storage system 40 is defined.

The common I/F 1711 is the API used among the multiple external storage systems 40 in common as, for example, the API illustrated in FIG. 5A. Said differently, the common I/F 1711 of the file processing unit 171 is an API group of APIs for using a function (e.g., a file acquisition, and a file storage) related to a file operation that can be used by all the external storage systems 40.

On the other hand, the unique I/F 1712 is the API used by a specific external storage system 40 as, for example, the API illustrated in FIG. 5B. Said differently, the unique I/F 1712 of the file processing unit 171 is an API group of APIs for using a function (e.g., an addition of a file to a document) related to a file operation which can be used by a specific external storage systems 40.

Therefore, the common I/F 1711 is similarly defined for all the external-storage collaborating units 170. On the other hand, the unique I/F 1712 is defined for the external-storage collaborating unit 170 corresponding to a specific external storage system 40, in which the API defined by the unique I/F 1712 can be used.

The data processing unit 172 includes a common I/F 1721 and a unique I/F 1722, in which an API for acquiring meta data (e.g., an file view, and a folder view) of bibliographic information of the electronic file stored in the external storage system 40 is defined.

The common I/F 1721 is the API used among the multiple external storage systems 40 in common as, for example, the API illustrated in FIG. 5C. Said differently, the common I/F 1721 of the data processing unit 172 is an API group of APIs for using a function (e.g., a file view acquisition, and a folder view acquisition) related to a meta data acquisition that can be used by all the external storage systems 40.

On the other hand, the unique I/F 1722 is the API used by a specific external storage system 40 as, for example, the API illustrated in FIG. 5D. Said differently, the unique I/F 1722 of the data processing unit 172 is an API group of APIs for using a function (e.g., an acquisition of an image file view) related to an acquisition of metadata which can be used by a specific external storage systems 40.

Therefore, the common I/F 1721 is similarly defined for all the external-storage collaborating units 170. On the other hand, the unique I/F 1722 is defined for the external-storage collaborating unit 170 corresponding to a specific external storage system 40, in which the API defined by the unique I/F 1722 can be used.

As described, the service providing system 10 of the first embodiment includes the external-storage collaborating units 170, which respectively correspond to the external storage systems 40 processing in collaboration with the service providing system 10. Therefore, in a case where the external storage system 40 to be the collaboration destination is added or deleted (hereinafter, referred to as an "addition or the like"), the external-storage collaborating unit 170 corresponding to the external storage system 40 may be subjected to the addition or the like to the service providing system 10.

Therefore, in the service providing system 10 of the first embodiment, an influence caused by the addition or the like of the external storage system 40, which is to be the collaboration destination, can be localized. Said differently, in the service providing system 10 of the first embodiment, the addition or the like of the external storage system 40, which is to be the collaboration destination, can be done without influencing the other functional units (i.e., the service processing unit 110, the document servicing unit 160, or the like). Here, a software development kit (SDK) may be used for the addition or the like of the external-storage collaborating unit 170.

Further, in the file processing unit 171 of the external-storage collaborating unit 170, the common I/F 1711 and the unique I/F 1712 are defined as different modules or the like. The API defined by the common I/F 1711 and the unique I/F 1712 can be used by designating an "external storage name". Said differently, the external storage name is a variable portion.

With this, in a case where the external-storage collaborating unit 170 is added, it is possible to reuse the common I/F 1711 defined in the file processing unit 171 of the other external-storage collaborating unit 170. Said differently, in a case where the external-storage collaborating unit 170 is added, it is sufficient for the file processing unit 171 of the external-storage collaborating unit 170 to develop only the unique I/F 1722. Similarly, it is sufficient for the data processing unit 172 of the external-storage collaborating unit 170 to develop only the unique I/F 1722 without developing the common I/F 1721.

The app information memory unit 180 stores the app information 1000 for providing various services to the apparatus 20. The app information 1000 includes screen definition information 1100 for causing the apparatus 20 to display the service screen and process flow information 1200 being information related to the sequence of processes (the process flow) for substantializing the service.

The app information 1000 is associated with an app identification (ID) for uniquely identifying the app information 1000 and an app name of the app information 1000. Within the first embodiment, the app information 1000 using a scan function of the apparatus 20 is designated as "app information 1000A", the app ID is "app001", and the app name is "scan app". The app information 1000A includes screen definition information 1100A and process flow information 1200A. The process flow information 1200A is described in detail later.

The app information memory unit 180 additionally includes app information 1000B (the app ID "app002" and the app name "print app") using a print function of the apparatus 20. The app information 1000 may include multiple screen definition information 1100 and multiple process flow information 1200.

Figure 6:
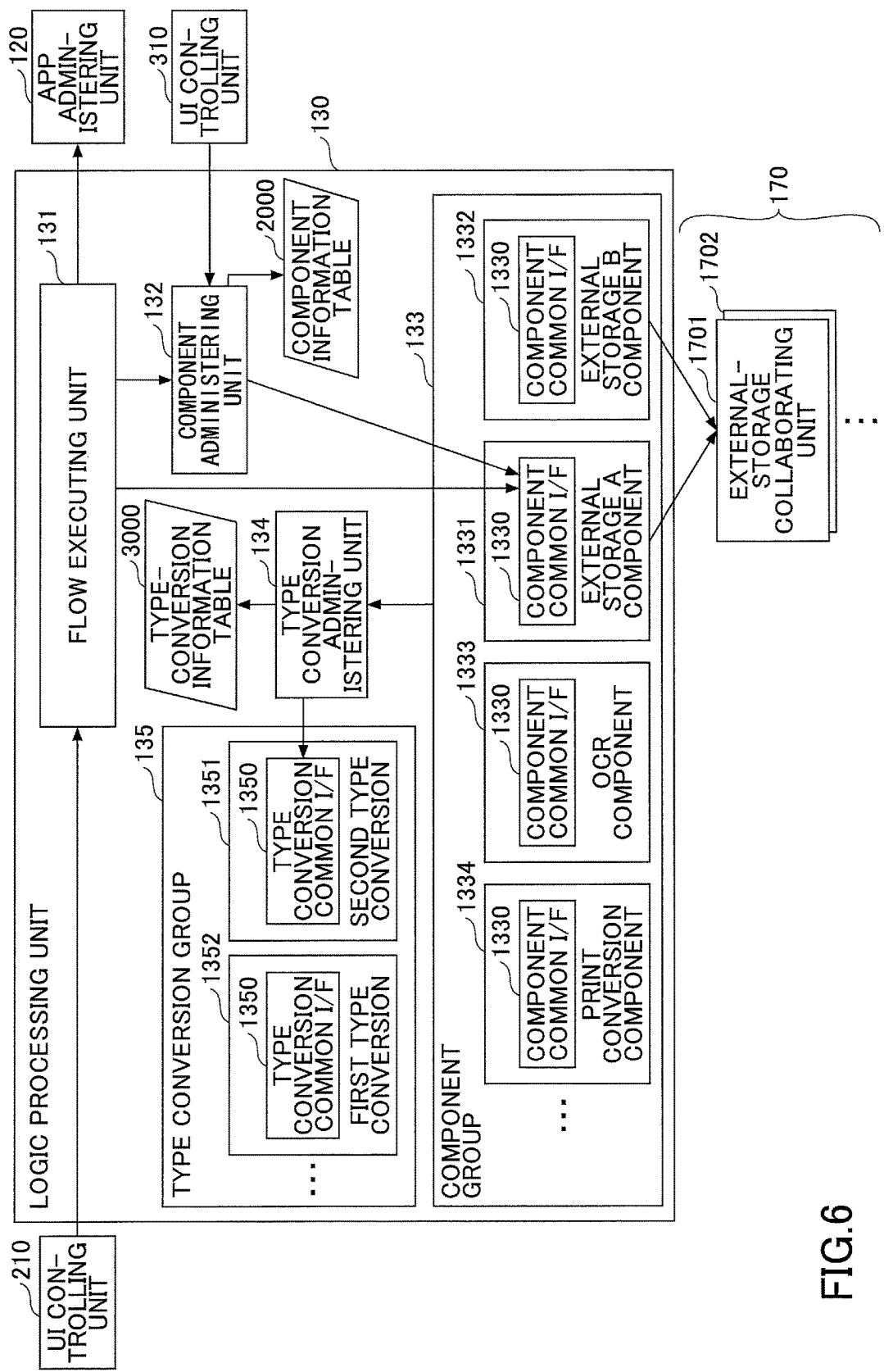
FIG. 6 is a diagram illustrating a functional structure of an exemplary logic processing unit of the first embodiment.

Referring to FIG. 6, a detailed functional structure of the logic processing unit 130 is described. FIG. 6 is a diagram illustrating the functional structure of an exemplary information processing unit 130 of the first embodiment.

The logic processing unit 130 includes a flow executing unit 131, a component administering unit 132, a component group 133, a type conversion administering unit 134, and a type conversion group 135. Further, the logic processing unit 130 uses a component information table 2000 and a type-conversion information table 3000.

The flow executing unit 131 acquires the process flow information 1200 included in the app information 1000 through the app administering unit 120 in response to a request from the UI controlling unit 210 of the apparatus 20. Then, the flow executing unit 131 requests the component to execute the process in accordance with the acquired process flow information 1200.

Here, the component is, for example, a module for executing one process included in the sequence of processes (the process flow) in accordance with the process flow information 1200. Therefore, the sequence of processes in accordance with the process flow information 1200 is substantialized by combining processes, each of which is executed by at least one component. The component is defined by, for example, a class, a mathematical function, or a like.

The component administering unit 132 generates the component in response to a request from the flow executing unit 131. Here, the generation of the component means that the component defined by, for example, the class, the mathematical function, or a like is deployed on the memory (for example, the RAM 14).

Further, the component administering unit 132 returns component information stored in the component information table 2000 in response to a request from the UI controlling unit 310.

Here, referring to FIG. 7, the component information table 2000 is described in detail. FIG. 7 illustrates an exemplary component information table.

The component information stored in the component information table 2000 illustrated in FIG. 7 includes data items of a component name, a component ID, an operation name, an operation ID, and a parameter.

The component name is the name of the component. The component ID is identification information uniquely identifying the component. The operation name is the name of the operation indicative of a process executed by the component. The operation ID is information identifying the operation. The parameter is various information set to a process executed by the component.

For example, the component name "external storage A component" having the component ID "storageA" includes the operation name "delivery" having the operation ID "uploadFile" and the operation name "acquisition" having the operation ID "getFiles". This case designates that the external storage A component includes a delivery operation for delivering (uploading) the electronic file to the external storage A and an acquisition operation for acquiring (downloading) the electronic file from the external storage A.

The delivery operation indicates that "folderID" indicative of the folder ID of the delivery destination in the external storage A is designated as a parameter. The acquisition operation indicates that "fileID" indicative of the file ID of the acquisition destination in the external storage A is designated as a parameter.

Similarly, the component name "OCR component" having the component ID "ocr" includes the operation name "OCR" having the operation ID "process", for example. This case indicates that the OCR component includes an OCR operation for providing the OCR process to the electronic file.

Further, the OCR operation indicates that "language" indicative of the language being the target of the OCR process and "outputType" indicative of the data format of the electronic file after the OCR process is designated as parameters.

As described above, at least one operation is included in each of the components. When the operation and a parameter corresponding to the operation are designated, the component can execute the process indicated by the designated operation.

The component group 133 is a set of the components. The component group 133 includes the external storage A component 1331, which conducts the process in collaboration with the external storage system 401 (an external storage A). Further, the component group 133 includes the external storage B component 1332, which conducts the process in collaboration with the external storage system 402 (an external storage B).

Further, the component group 133 includes an OCR component 1333 for providing the OCR process to the electronic file, and a print conversion component 1334 for converting the electronic file to print data.

The component group 133 may additionally include a size conversion component for converting the size of the image file and a translation component for translating the language, and so on, for example.

Further, each of these components includes a component common I/F 1330. The component common I/F 1330 is an application programming interface (API) defined for each of these components in common, and includes an API for generating the component and an API for requesting the component to execute the process.

As described, it is possible to localize an influence caused by the addition or the like of the component because each of the components has the component common interface (I/F) 1330. Said differently, the service providing system 10 of the first embodiment can conduct the addition or the like without influencing the flow executing unit 131 and the component administering unit 132, for example.

The type conversion administering unit 134 administers a type conversion of a data type. The data type which can be handled by each of the components is previously determined. Therefore, the type conversion administering unit 134 generates a type conversion defined in the type conversion group 135 by referring to the type-conversion information table 3000 in response to a request from the component. The type conversion administering unit 134 requests to execute a type conversion process for the generated type conversion. With this, the type conversion administering unit 134 conducts the type conversion, by which the component of a request source can handle.

Here, referring to FIG. 8, the type-conversion information table 3000 is described in detail. FIG. 8 illustrates an exemplary type-conversion information table.

Type conversion information stored in the type-conversion information table 3000 illustrated in FIG. 8 includes data items of a data type before conversion, a data type after conversion, and a type conversion to be generated. Said differently, the type conversion information is associated with the type conversion to be generated for converting the data type before the conversion to the data type after the conversion for each of the data type before conversion and the data type after conversion.

Therefore, in a case where data are converted from a data type "InputStream" indicative of stream data to a data type "LocalFilePath" indicative of a path (an address) of the electronic file stored in the memory device or the like, a first type conversion may be generated.

Here, the generation of the type conversion means that the type conversion defined by, for example, the class is deployed on the memory (for example, the RAM 14). For example, the data type is "File" indicative of the entity of the electronic file in addition to the above described "InputStream" and "LocalFilePath".

The type conversion group 135 is a set of the type conversions. The type conversion group 135 includes a first type conversion 1351 converting data of the data type "InputStream" to data of the data type "LocalFilePath". The type conversion group 135 includes a second type conversion 1352 converting data of the data type "LocalFilePath" to data of the data type "File".

Further, each of the first type conversion 1351 and the second type conversion 1352 includes a type conversion common I/F 1350. The type conversion common I/F 1350 is an API defined for each of the first and second type conversions 1351 and 1352 in common, and includes an API for generating the type conversion and an API for requesting the type conversion to execute the process.

As described, it is possible to localize an influence caused by the addition or the like of the component because each of the first and second type conversions 1351 and 1352 has the component common interface (I/F) 1350. Said differently, the service providing system 10 of the first embodiment can conduct the addition or the like without influencing the conversion administering unit and so on, for example.

The process flow information 1200 included in the app information 1000 is described in detail. Hereinafter, referring to FIG. 9, an example of process flow information 1200A included in app information 1000A is explained. FIG. 9 illustrates an exemplary process flow information.

The process flow information 1200A illustrated in FIG. 9 relates to a sequence of processes of substantializing a service (the OCR delivery), in which the OCR process is provided to the electronic file generated by scanning in the apparatus 20 and the electronic file provided with the OCR process is stored into the external storage A.

The process flow information 1200A includes a flow ID 1201A indicative of identification information of the process flow information 1200A, a flow name 1202A indicative of the name of the process flow information 1200A, and a detailed flow 1203A indicative of a process content of the sequence of processes.

The detailed flow 1203A includes a process content 1213A indicative of the OCR process and a process content 1223A indicative of a delivery (an upload) to the external storage A.

In the process content 1213A, the component ID "ocr" of the component executing the OCR process, the operation ID "process", and the parameters "language" and "outputType" are designated. Similarly, in the process content 1223A, the component ID "storageA" of the component executing the process in collaboration with the external storage A, the operation ID "uploadFile" indicative of the delivery process, and the parameter "folderID" are designated.

With this, in the sequence of processes in accordance with the process flow information 1200, after providing the OCR process to the electronic file, the electronic file provided with the OCR process can be stored in the external storage A. As described, in the service providing system 10 of the first embodiment, the sequence of processes is substantialized by the process flow information 1200 including the process content, in which the component ID, the operation ID, and the parameter are designated.

The processes defined in each of the process contents begin at the top of the detailed flow 1203A and are sequentially executed. Said differently, the sequence of processes (the process flow) in accordance with the process flow information 1200A illustrated in FIG. 9 is executed in an order from processes defined in the process content 1213A to the process content 1223A. However, the sequence of processes is not limited to this order, and information indicative of the execution order of the processes may be defined in the process flow information 1200A.

<Detailed Process>

Described next is a detailed process of the information processing system 1 of the first embodiment.

Figure 10:
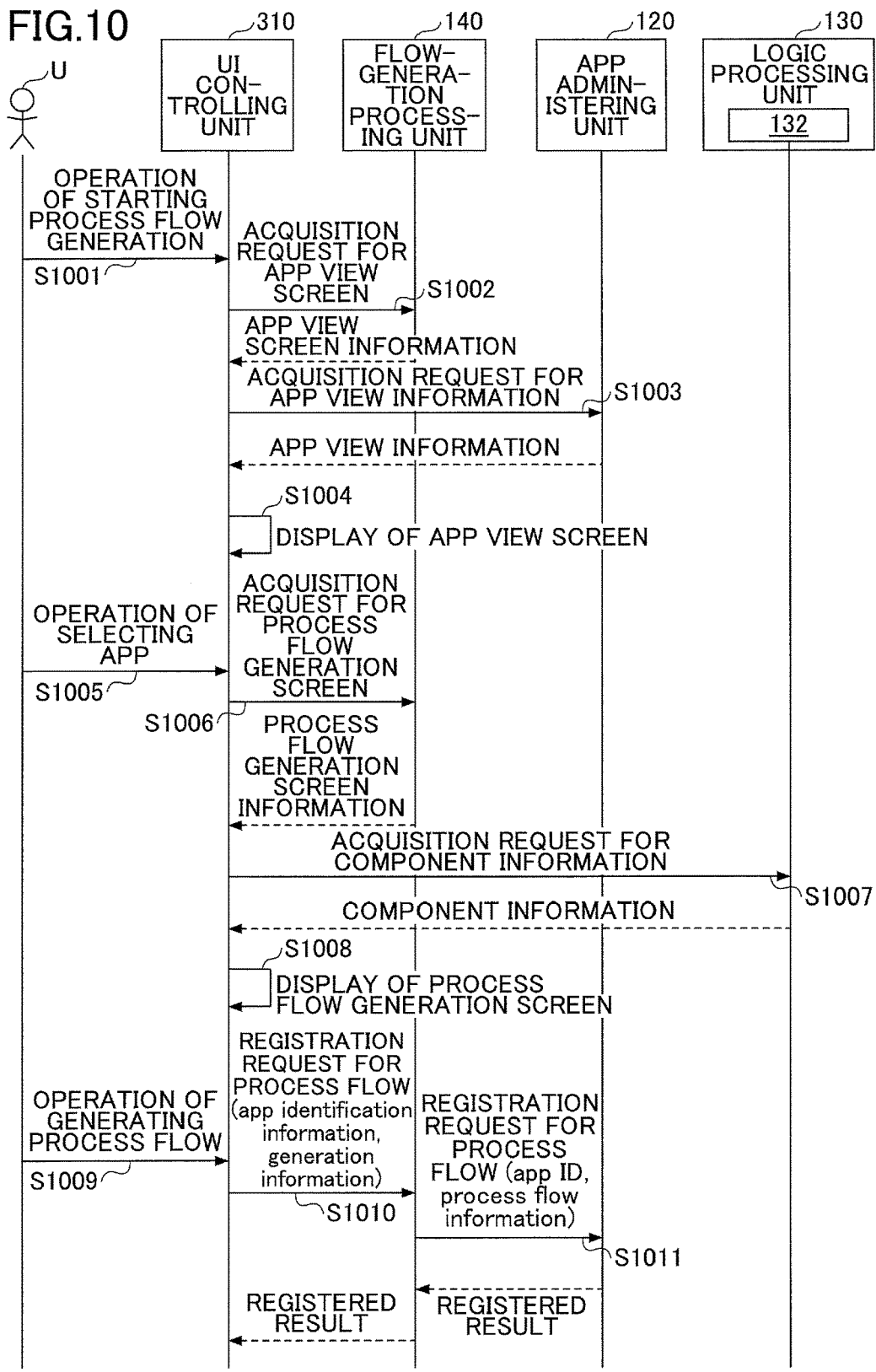
FIG. 10 is a sequence chart of an exemplary registration process for a process flow of the first embodiment.

Referring to FIG. 10, described are processes in a case where a user U generates a process flow using the PC terminal 30 and registers the process flow information 1200 of the generated process flow in the service providing system 10. FIG. 10 is a sequence chart of an exemplary registration process for the process flow of the first embodiment.

The user U conducts an operation of starting process flow generation using the PC terminal 30 (step S1001). For example, the user U uses the PC terminal 30 to log in the service providing system 10 using, for example, the PC terminal 30, thereafter logs in the service providing system 10, and selects a button of "process flow generation" on a portal screen, which is displayed after the login, or the like to conduct an operation of starting process flow generation.

After the UI controlling unit 310 of the PC terminal 30 receives the operation of starting the process flow generation, the UI controlling unit 310 sends an acquisition request for an app view screen to the flow-generation processing unit 140 of the service providing system 10 (step S1002). The flow-generation processing unit 140 receives the acquisition request and then returns app view screen information.

Here, the app view screen information is information for displaying a view of an application (the app information 1000) for providing the service. The app view screen information is represented by a data format of, for example, HyperText Markup Language (HTML), or the like.

After the UI controlling unit 310 of the PC terminal 30 receives the app view screen information, the UI controlling unit 310 sends an acquisition request for app view information to the app administering unit 120 of the service providing system 10 (step S1003). Then, the app administering unit 120 receives the acquisition request, thereafter acquires the app ID and the app name of the app information 1000 stored in the app information memory unit 180 and returns the acquired app ID and app name as app view information.

Figure 11:
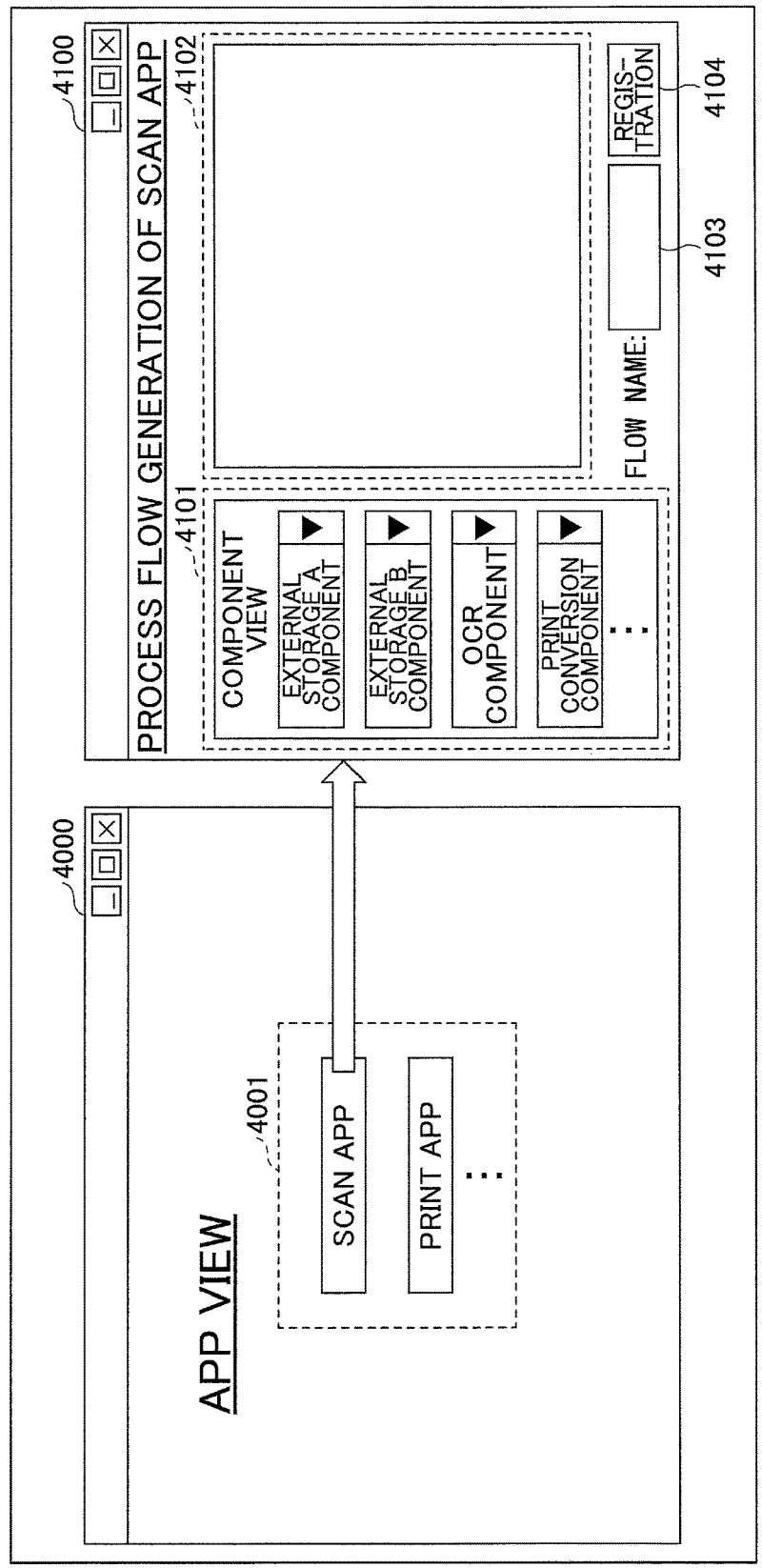
FIG. 11 illustrates an exemplary screen transition from an application (app) view screen to a process flow generation screen.

When the UI controlling unit 310 of the PC terminal 30 receives the app view information, the UI controlling unit 310 reflects the app view information on the app view screen information to cause the display device 12 to display the app view screen 4000 illustrated in, for example, FIG. 11 (step S1004). The app view screen 4000 illustrated in FIG. 11 includes an app name view 4001 displaying the list of the app names in accordance with the app view information.

Next, the user U conducts an operation of selecting the application for generating the process flow using the app name view 4001 of the app view screen 4000 (step S1005). Described next is a case where "scan app" is selected by the user U from the app name view 4001 of the app view screen 4000.

After the UI controlling unit 310 of the PC terminal 30 receives the operation of selecting the application, the UI controlling unit 310 sends an acquisition request for a process flow generation screen to the flow-generation processing unit 140 of the service providing system 10 (step S1006). The acquisition request includes information (e.g., information for identifying each displaying part included in the app name view 4001) for identifying the application selected by the user U. However, the acquisition request may include the app ID of the application (the app information 1000) selected by the user U.

The flow-generation processing unit 140 receives the acquisition request for the process flow generation screen, and thereafter returns the process flow generation screen information. The process flow generation screen information is provided to display the process flow generation screen of the selected application and represented by the data format of, for example, HTML.

After the UI controlling unit 310 of the PC terminal 30 receives the process flow generation screen information, the UI controlling unit 310 sends an acquisition request for component information to the component administering unit 132 of the service providing system 10 (step S1007). Then, the component administering unit 132 receives the acquisition request, and returns the component information stored in the component information table 2000.

When the UI controlling unit 310 of the PC terminal 30 receives the component information, the UI controlling unit 310 reflects the component information on the process flow generation screen information to cause the display device 12 to display the process flow generation screen 4100 illustrated in, for example, FIG. 11 (step S1008). Said differently, when "scan app" is selected by the user U on the app view screen 4000, the UI controlling unit 310 performs a screen transition to the process flow generation screen.

The process flow generation screen 4100 is provided to generate the process flow of the scan app and includes a component view 4101, on which a view of the component name is displayed in accordance with the component information. Further, the process flow generation screen 4100 includes a generation area 4102 for graphically generating the process flow, a flow name input column 4103 for designating the flow name of the process flow, and a registration button 4104 for registering the generated process flow.

The user U can generate the process flow of the scan app on the process flow generation screen 4100 illustrated in FIG. 11.

Next, the user U conducts an operation of generating the process flow of the scan app on the process flow generation screen 4100 (step S1009).

Figure 12A:
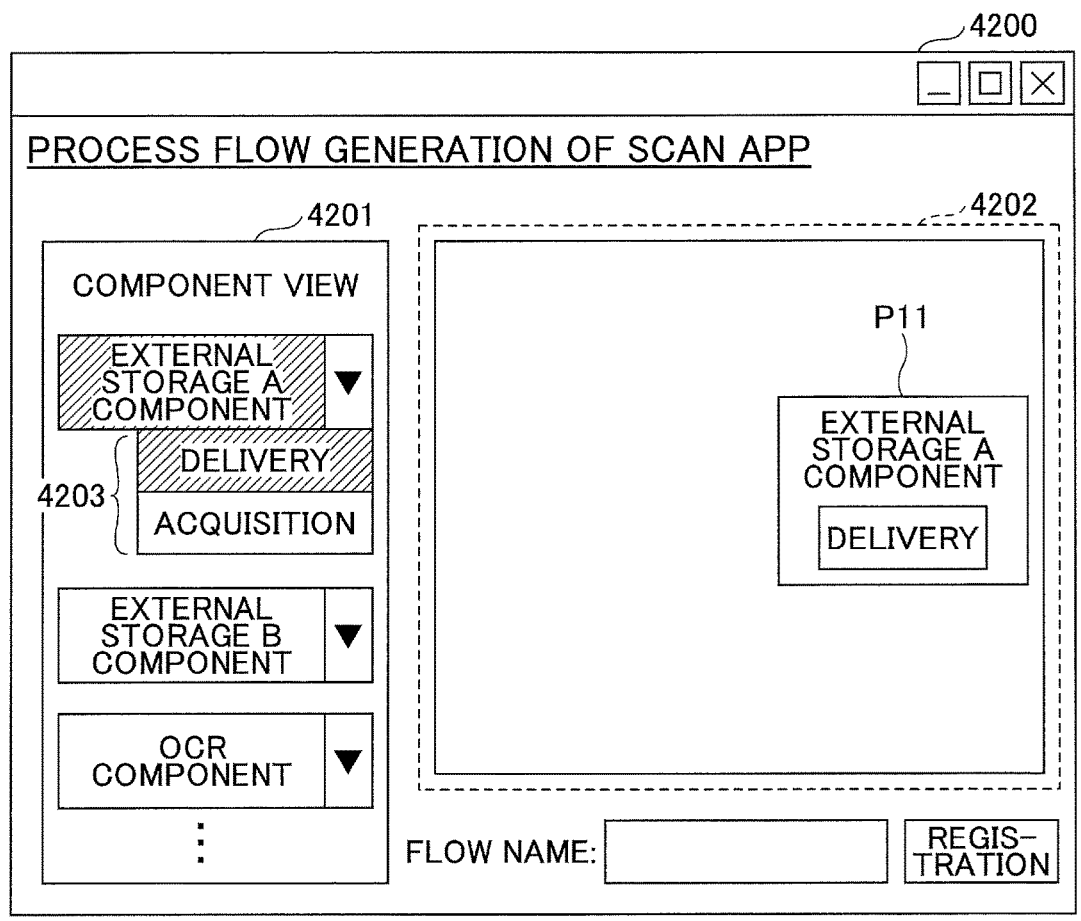
FIGS. 12A and 12B illustrate exemplary process flow generation screens.
Figure 12B:
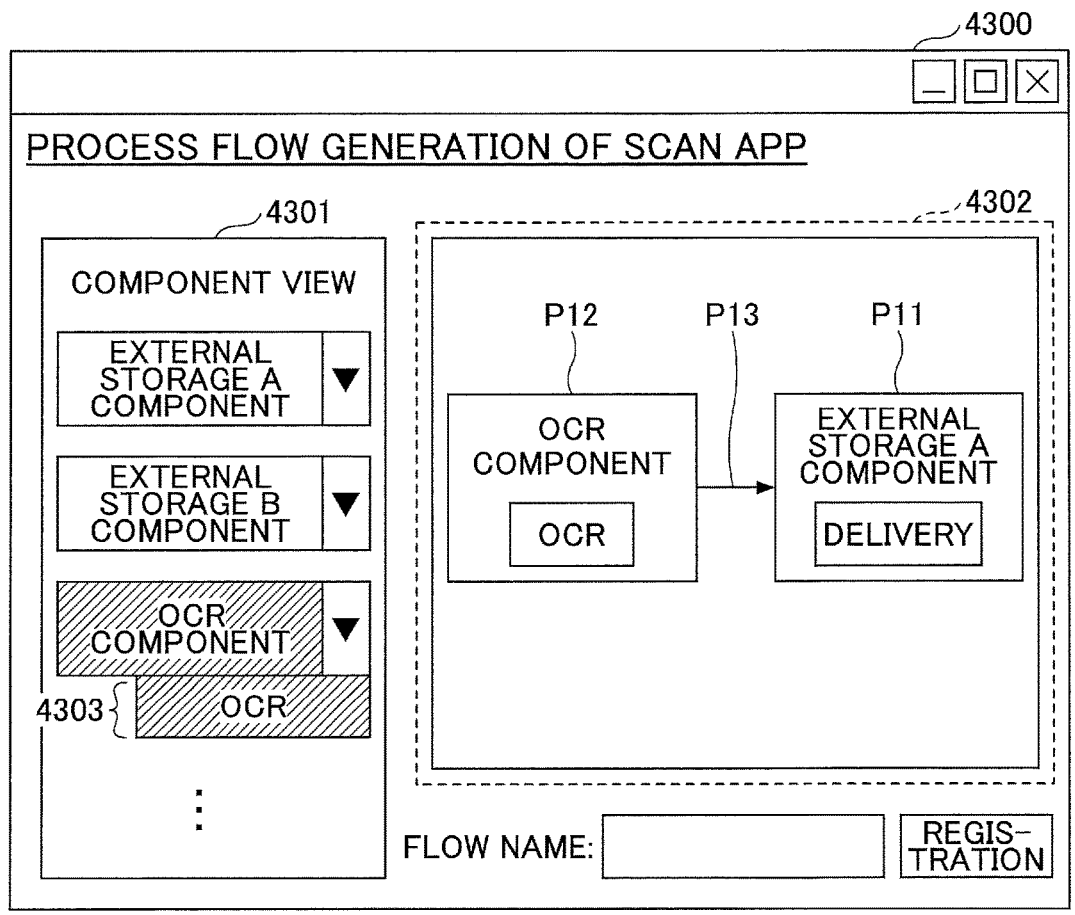
Figure 13A:
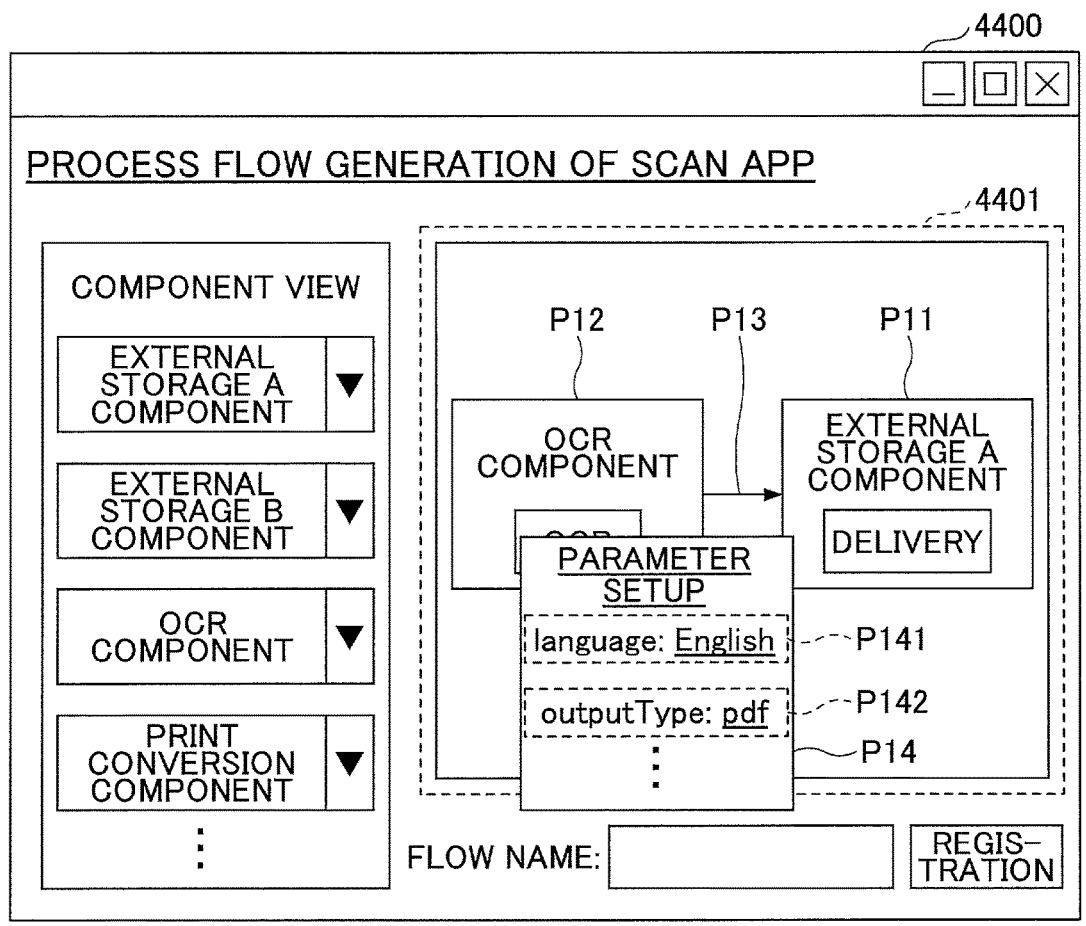
FIGS. 13A and 13B illustrate other exemplary process flow generation screens.
Figure 13B:
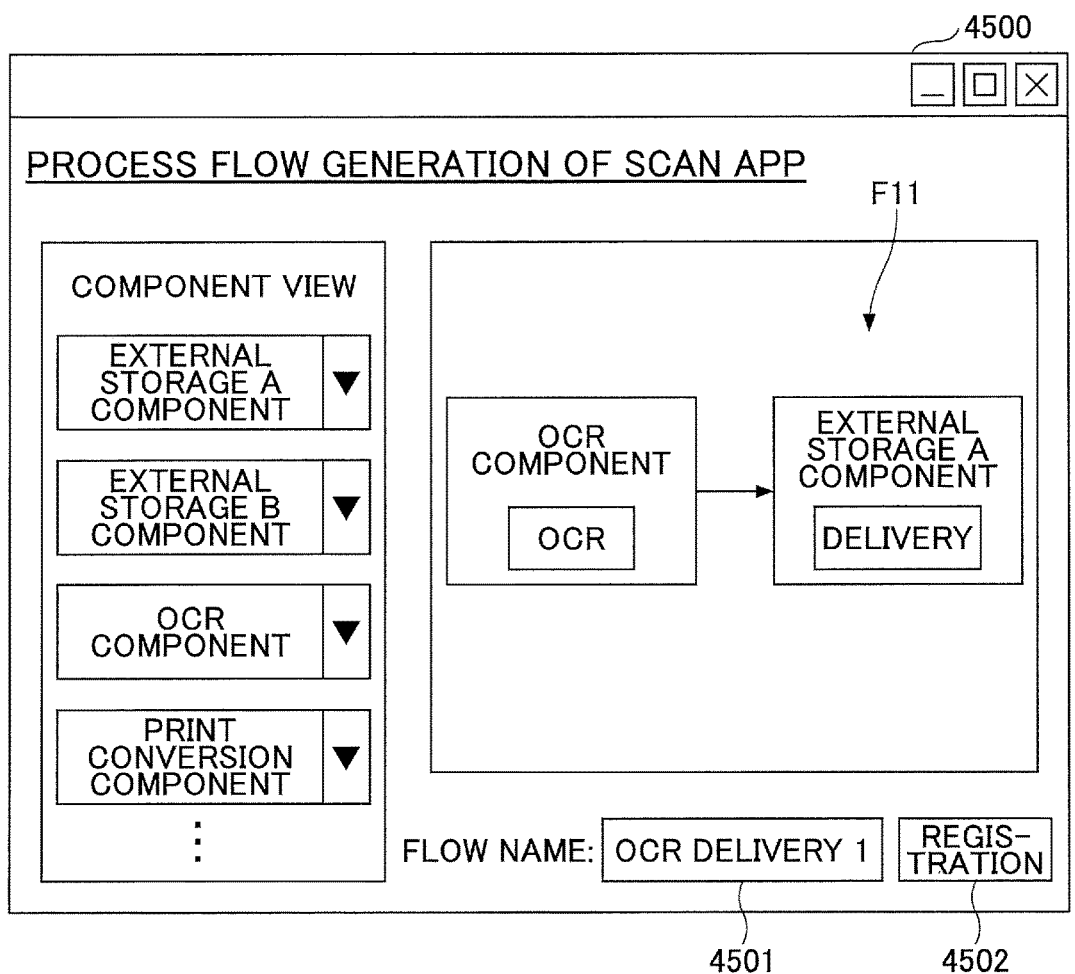

As an example, referring to FIGS. 12 and 13, described is a case where a process flow indicative of the process flow information 1200A is generated by the user U on the process flow generation screen 4100. FIGS. 12 and 13 illustrate an exemplary process flow generation.

At first, when the user U selects the "external storage A component" from a component view 4201 on a process flow generation screen 4200 illustrated in FIG. 12A, an operation view 4203 of the external storage A component is displayed. As such, when the component is selected from the component view 4201, the operation view of the selected component is displayed.

Next, when the user U selects "delivery" from the operation view 4203 and selects a preferred position inside the generation area 4202, an icon P11 is displayed. The icon P11 represents a process indicated by an operation name "delivery" of the component name "external storage A component".

As described, when the user U selects the component and the operation and thereafter selects the preferred position inside the generation area 4202, an icon indicative of a process designated by the selected component and operation is displayed.

Similarly, when the user U selects "OCR component" from the component view 4301 in the process flow generation screen 4300 illustrated in FIG. 12B, an operation view 4304 of the OCR component is displayed.

Next, when the user U selects "OCR" from the operation view 4303 and selects a preferred position inside the generation area 4302, an icon P12 is displayed. The icon P12 represents a process indicated by an operation name "OCR" of a component name "OCR component".

Subsequently, when the user U performs an operation of designating a backward and forward relationship between the icon P12 and the icon P11, an arrow P13 is displayed. With this, the user U designates the process indicated by the icon P11 follows the process indicated by the icon P12.

Next, for example, the user U selects the icon P12 on the process flow generation screen 4400 illustrated in FIG. 13A, a window P14 is displayed. The window P14 is a setup screen for setting a parameter P141 and a parameter P142 of the operation "OCR" of the OCR component. Described next is an exemplary case where the user U sets the parameter P141 and P142 respectively to "English" and "pdf".

The user U may select the icon P11 to cause a setup screen for setting the parameter of the operation "delivery" of the external storage A component and set the parameter.

On a process flow generation screen 4500, the user U inputs a flow name of the generated process flow F11 into a flow name input column 4501 and pushes a registration button 4502. With this, the process flow information 1200A indicative of the process flow F11 generated by the user U is generated. The flow ID of the process flow F11 may be generated so as to be unique in the app information 1000A.

Although the user U selects the component name and the operation name from the component view and thereafter the preferred position on the generation area is selected so as to display the icon indicative of the component and the icon indicative of the operation in the above, the first embodiment is not limited thereto. For example, the component name and the operation name are subjected to drag and drop from the component view to the generation area so as to display the icon indicative of the component and the icon indicative of the operation.

Referring back to FIG. 10, after the process flow is generated by the user U, the UI controlling unit 310 sends a registration request to register the process flow to the flow-generation processing unit 140 of the service providing system (step S1010). The registration request includes generation information (e.g., identification information of the icon indicating the component and generated in the generation area and the icon indicating the operation and generated in the generation area, relevance information indicative of relevance between these icons, or the like) of the process flow F11 generated by the user U. Further, the registration request includes information for identifying a scan app (e.g., information for identifying the process flow generation screen 4500).

However, the UI controlling unit 310 may generate the process flow information 1200A indicative of the process flow F11 generated by the user U and the generated process flow information 1200A may be included in the registration request and sent to the service providing system 10. Further, the UI controlling unit 310 may cause the registration request to include the app ID "app001" of the scan app.

When the flow-generation processing unit 140 of the service providing system 10 receives a registration request to register the process flow, the flow-generation processing unit 140 generates the process flow information 1200A indicative of the process flow F11 in accordance with the generation information of the process flow F11 included in the registration request. The flow-generation processing unit 140 specifies the app ID "app001" of the app information 1000A of the scan app using information for identifying the scan app included in the registration request.

The flow-generation processing unit 140 sends a registration request to register the process flow including the process flow information 1200A and the app ID "app001" to the app administering unit 120 (step S1011). The flow-generation processing unit 140 may specify the app ID "app001" from the information for identifying the scan app in accordance with the process flow generation screen information.

After the app administering unit 120 receives the registration request to register the process flow, the app administering unit 120 causes the app information memory unit 180 to store the process flow information 1200A included in the registration request while associating the process flow information 1200A with the app ID "app001". With this, the process flow information 1200A is registered into the service providing system 10.

The app administering unit 120 returns a registered result indicating that the process flow information 1200A is registered through the flow-generation processing unit 140 to the UI controlling unit 310.

As described, the information processing system 1 of the first embodiment can cause the service providing system 10 to store the process flow information 1200 indicative of the process flow generated by the user.

Further, the information processing system 1 of the first embodiment selects the preferred component and the preferred operation from the component view and thereafter designates the backward and forward relationship to generate the process flow. Therefore, the user can easily generate the process flow.

Here, the process flow information 1200 is described by using, for example, JavaScript Object Notation (JSON), Extensible Markup Language (XML), Domain-Specific Language (DSL). Therefore, the information processing system 1 of the first embodiment enables a user who does not understand the specifications or the formats of JSON, XML, or DSL to easily generate the process flow.

Described above is a case where the process flow having only one backward and forward relationship is generated. However, the number of the backward and forward relationships of the process flow may be plural.

Figure 14A:
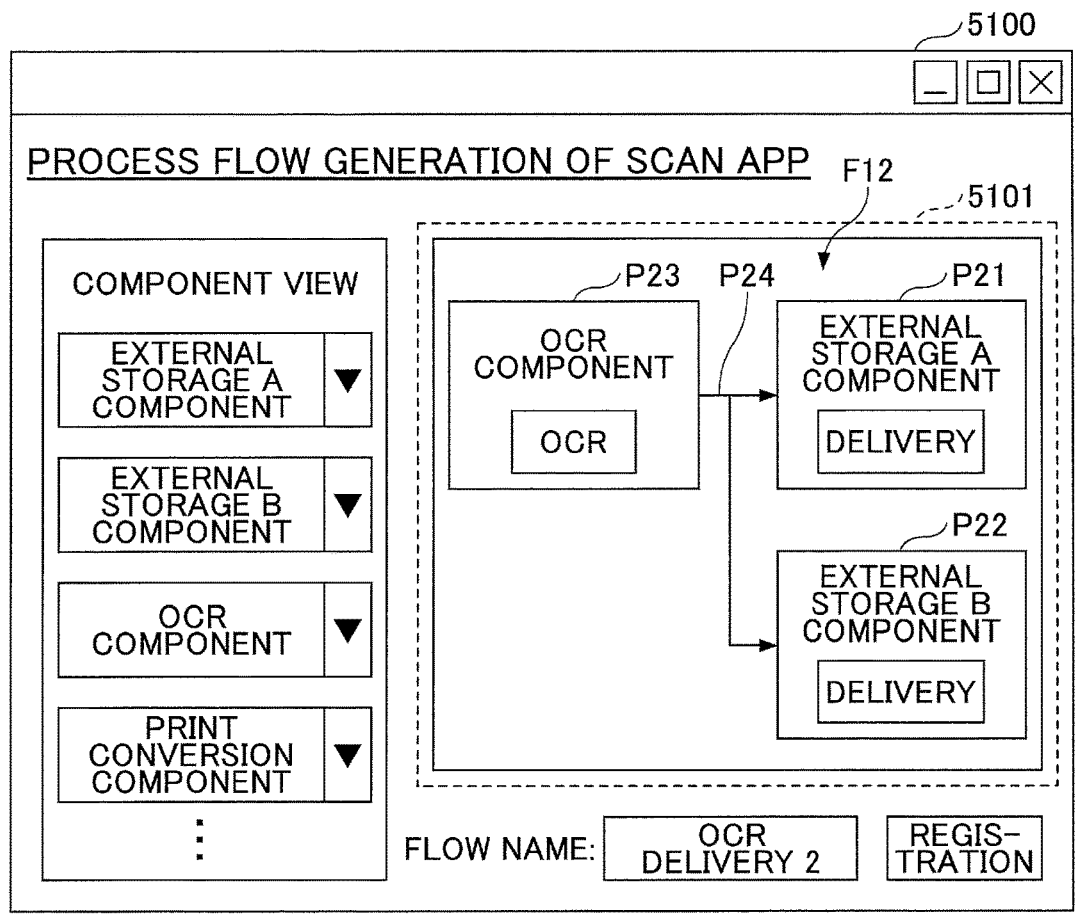
FIGS. 14A and 14B illustrate other exemplary process flow generation screens.

For example, on the process flow generation screen 5100 illustrated in FIG. 14A, a process flow F12 having multiple succeeding processes is generated in a generation area 5101. In the process flow F12, an icon P21 and an icon P22 are generated as the processes succeeding the icon P23. According to the process flow F12, the electronic file scanned by the apparatus 20 to be generated is provided with the OCR process. Then, the result of the OCR is delivered (uploaded).

Figure 14B:
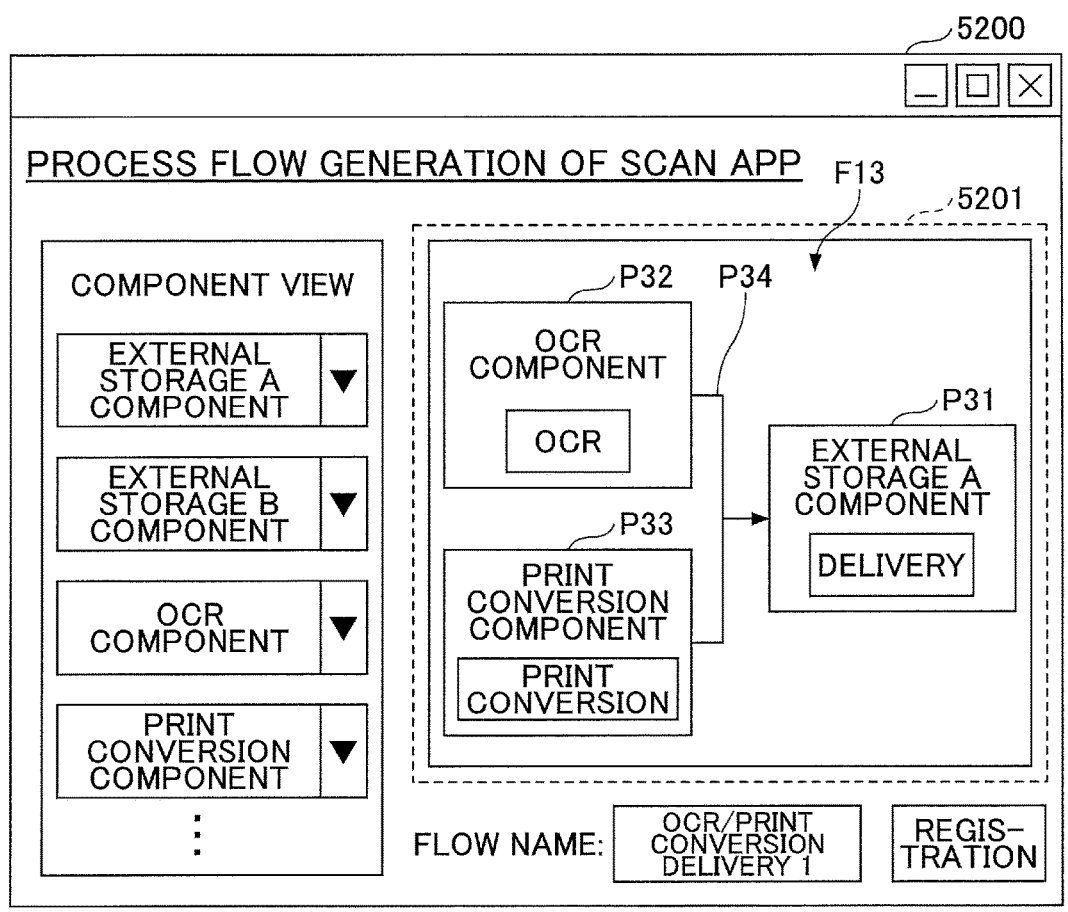

For example, on the process flow generation screen 5200 illustrated in FIG. 14B, a process flow F13 having multiple preceding processes is generated in a generation area 5201. In the process flow F13, an icon P32 and an icon P33 are generated as the processes preceding the icon P31. According to this process flow F13, an OCR electronic file obtained by providing the OCR to a scanned electronic file generated by scanning using the apparatus 20 and a print electronic file obtained by converting the scanned electronic file to print data can be delivered to the external storage A.

Next, referring to FIG. 15, described is a process in a case where the user U uses the apparatus 20 to use a service provided by the application (the app information 1000). FIG. 15 is a sequence chart of an exemplary overall process for a service use of the first embodiment.

The user U uses the apparatus 20 and performs a display operation of a service view provided by the app information 1000 (step S1501).

After the UI controlling unit 210 of the apparatus 20 receives a display operation for displaying the service view, the UI controlling unit 210 sends an acquisition request to acquire the service view to the app administering unit 120 of the service providing system 10 (step S1502). After the app administering unit 120 receives the acquisition request, the app administering unit 120 returns service view screen information.

The service view screen information is provided to display the service view provided by the app information 1000. The service view screen information is indicated in a data format of, for example, HTML. The service view screen information includes the app ID of the app information 1000, and the flow ID and the flow name of the process flow information 1200 included in the app information 1000.

Figure 16:
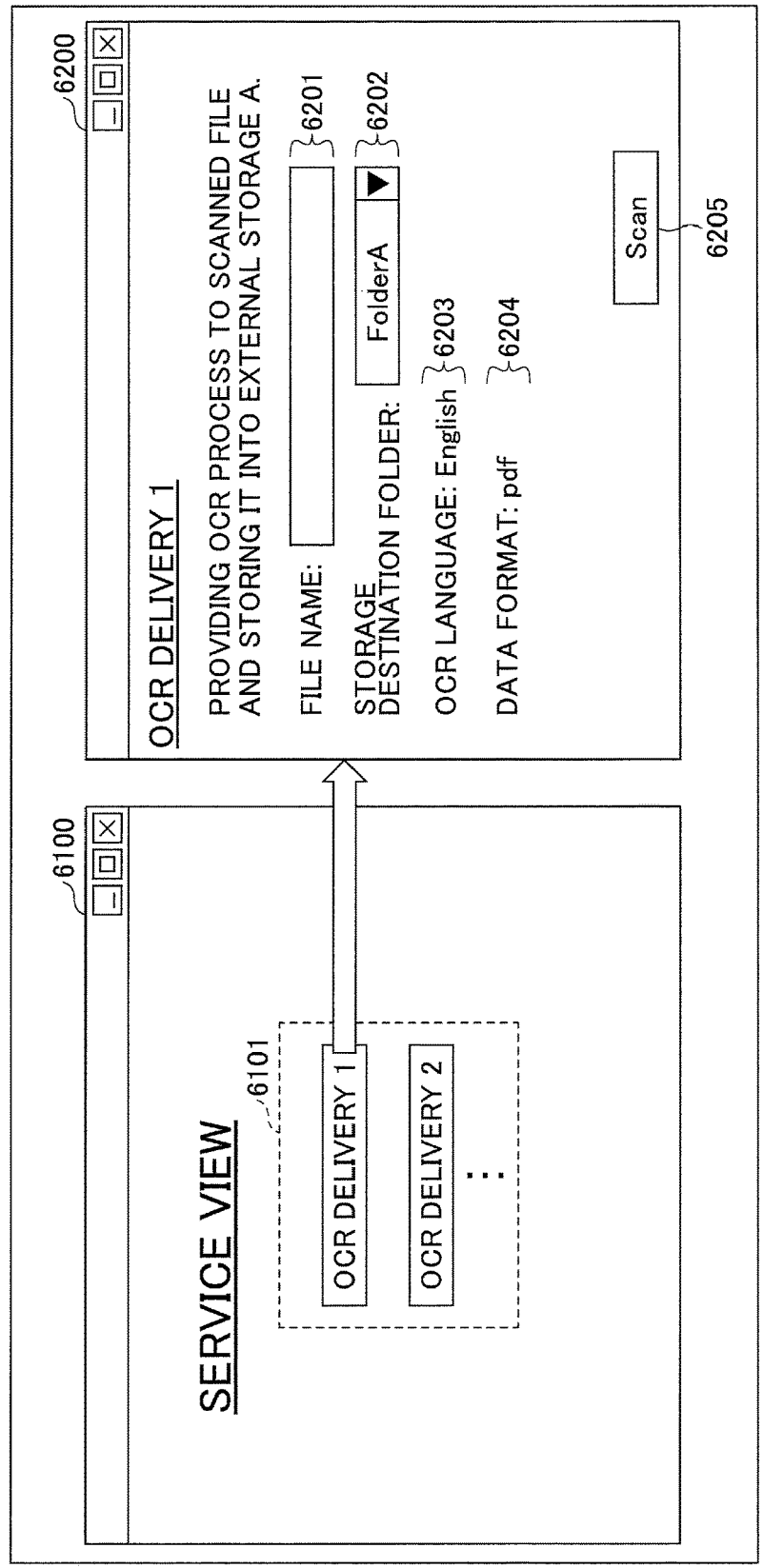
FIG. 16 illustrates an exemplary screen transition from a service view screen to a service screen.

After the UI controlling unit 210 of the apparatus 20 receives the service view screen information, the UI controlling unit 210 causes the operation panel 22 to display, for example, the service view screen 6100 illustrated in FIG. 16 in accordance with the service view screen information (step S1503). The service view screen 6100 illustrated in FIG. 16 includes a service name view, in which a view of the service names are displayed based on the flow ID and the flow name, which are included in the service view screen information.

The flow name of the process flow information 1200 included in the app information 1000 is the service name in the service view screen 6100 illustrated in FIG. 16. However, the service name is not limited to this service name, and an arbitrary service name may be displayed.

Next, the user U conducts an operation of selecting a desired service from a service name view 6101 of the service view screen 6100 (step S1504). Described next is a case where "OCR delivery 1" is selected by the user U from the service name view 6101 of the service view screen 6100.

After the UI controlling unit 210 of the apparatus 20 receives a selection operation of selecting the service, the UI controlling unit 210 sends an acquisition request to acquire the service screen to the app administering unit 120 of the service providing system 10 (step S1505). This acquisition request includes the app ID "app001" of the app information 1000A of providing a service selected by the user U and the flow ID "flow001" of the process flow information 1200A substantializing the service.

After the app administering unit 120 receives the acquisition request to acquire the service screen, the app administering unit 120 acquires the screen definition information 1100A corresponding to the app ID "app001" and the flow ID "flow001", which are included in the acquisition request, and returns the screen definition information 1100A.

After the UI controlling unit 210 of the apparatus 20 receives the screen definition information 1100A, the UI controlling unit 210 sends an acquisition request to acquire display information for displaying the service screen to the data I/F unit 150 of the service providing system 10 (step S1506).

The display information is each selection element of a selection column on the service screen. The display information is, for example, a folder view (a view of folder names and folder IDs), which is a candidate of a storage destination folder in the external storage. Hereinafter, described is a case where the acquisition request to acquire the display information is the acquisition request to acquire the folder view indicative of candidates of the folder at the storage destination in the external storage A.

The acquisition request for the folder view can be conducted using the API "external storage name/data/folders" illustrated in FIG. 5C. Said differently, the UI controlling unit 210 sends a Hypertext Transfer Protocol (HTTP) request as, for example, "/storage-a/data/folders" to the data I/F unit 150 to request to acquire the folder view of the external storage A.

After the data I/F unit 150 of the service providing system 10 receives the acquisition information for the display information, the data I/F unit 150 transfers the acquisition request to the data processing unit 172 of the corresponding external-storage collaborating unit 170 (step S1507). Said differently, the data I/F unit 150 transfers the acquisition request for the received display information to the data processing unit 1721 of the external storage A collaboration unit 1701.

After the data processing unit 1721 of the external storage A collaboration unit 1701, the data processing unit 1721 sends an acquisition request to acquire the folder view to the external storage A and acquires folder view information indicative of the folder view (step S1508). Said differently, the data processing unit 1721 acquires the folder view information from the external storage A using the API defined in the common I/F 17211.

The data processing unit 1721 returns the folder view information to the UI controlling unit 210 through the data I/F unit 150.

After the UI controlling unit 210 of the apparatus 20 receives the folder view information, the UI controlling unit 210 causes the folder view information to be reflected in the screen definition information 1100A so that a service screen 6200 illustrated in, for example, FIG. 16 is displayed on the operation panel 22 (step S1509).

The service screen 6200 illustrated in FIG. 16 is a screen for using the service of the service name "OCR delivery 1" selected by the user U. The service screen 6200 includes a file name input column 6201, a storage destination folder selection column 6202, and a scan execution button 6205.

On the service screen 6200, preset parameters are displayed in OCR language 6203 and data format 6204 are displayed the process flow information 1200A corresponding to the service name "OCR delivery 1".

In the service screen 6200, selection elements in a storage destination folder selection column 6202 are set based on folder list information acquired from the external storage A in step S1507.

Next, the user U inputs a desired file name into the file name input column 6201 and selects a desired storage destination folder from the storage destination folder selection column 6202 on the service screen 6200. While an original is set to the scanner 26 of the apparatus 20, a scan execution button 6205 is pushed down (step S1510). Hereinafter, described below is a case where the user U inputs a file name "test" in the file name input column 6201 and the scan execution button 6205 is pushed down while "FolderB" is selected in the storage destination folder selection column 6202.

After the UI controlling unit 210 of the apparatus 20 receives the push of the scan execution button 6205, the UI controlling unit 210 sends an execution request to execute scan to the scan processing unit 220 (step S1511).

After the scan processing unit 220 of the apparatus 20 receives the scan execution request to execute the scan, the scan processing unit 220 controls the scanner 26, reads the set original, and generates the electronic file having the file name "test" (step S1512). The scan processing unit 220 returns a scan result indicative of the end of the scan.

After the UI controlling unit 210 of the apparatus 20 receives the scan result, the UI controlling unit 210 sends a process flow execution request to execute the process flow having the service name "OCR delivery 1" to the logic processing unit 130 of the service providing system 10 (step S1513). The execution request includes the app ID "app001" of the app information 1000A, the flow ID "flow001" of the process flow information 1200A, the electronic file having the file name "test", and the folder ID indicative of the storage destination folder "FolderB" selected by the user U.

The logic processing unit 130 of the service providing system 10 acquires the process flow information 1200A corresponding to the app ID and the flow ID, which are included in the received process flow execution request, and executes a sequence of processes in accordance with the process flow information 1200A (step S1514). The logic processing unit 130 returns the processes result of the sequence of processes.

With this, the service providing system 10 executes the sequence of processes substantializing the service name "OCR delivery 1" and provides "OCR delivery 1" to the apparatus 20.

Figure 17:
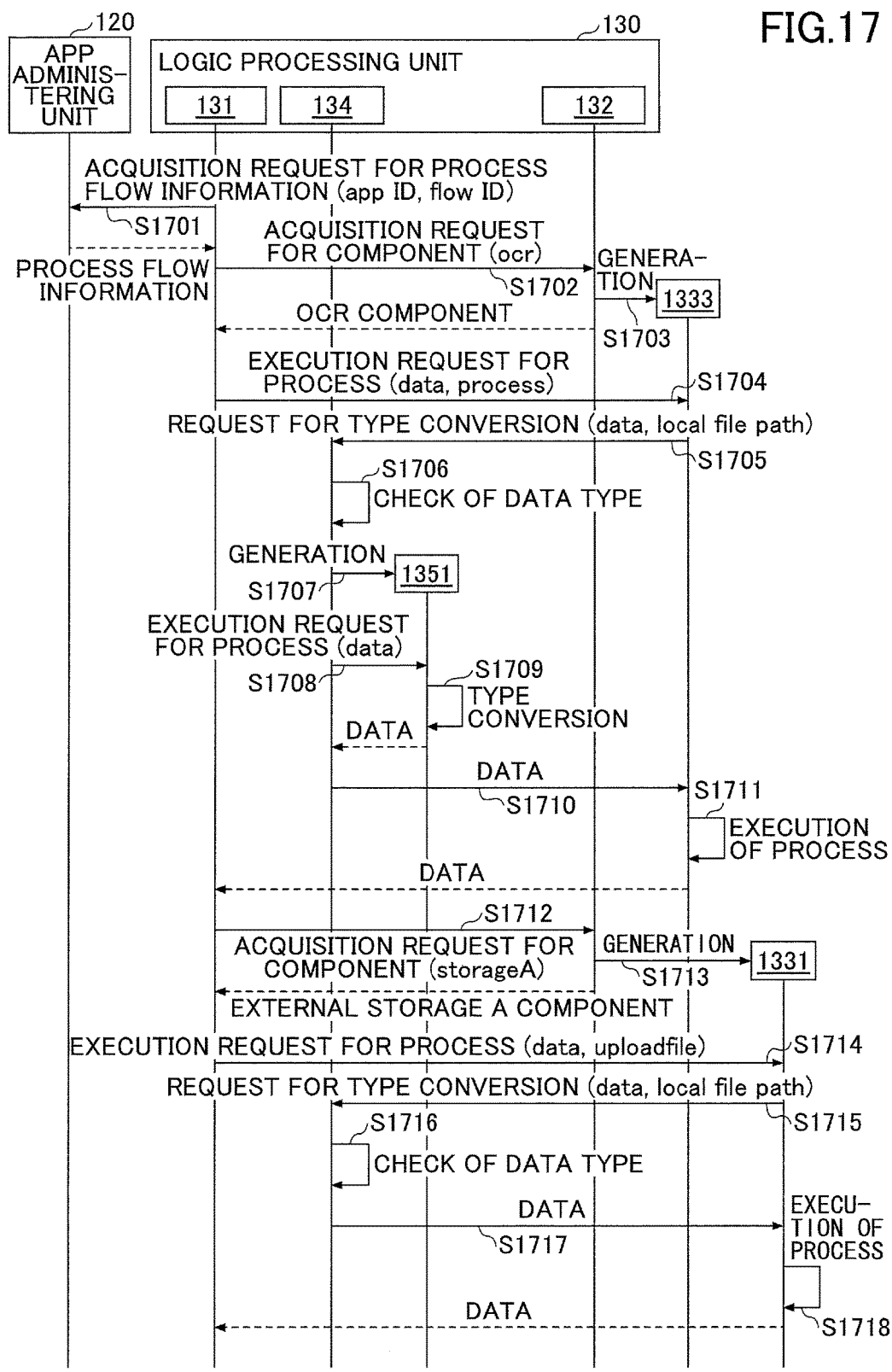
FIG. 17 is a sequence chart of an exemplary execution process for a process flow of the first embodiment.

Referring to FIG. 17, a detailed process flow execution process to execute the process flow in step S1514 is described. FIG. 17 is a sequence chart of an exemplary process flow execution process to execute the process flow of the first embodiment.

After the flow executing unit 131 receives a process flow execution request, the flow executing unit 131 sends an acquisition request to acquire the process flow information to the app administering unit 120 (step S1701). The acquisition request includes the app ID "app001" and the flow ID "flow001", which are included in the received process flow execution request.

The app administering unit 120 acquires the process flow information 1200A corresponding to the app ID "app001" and the flow ID "flow001", which are included the received process flow information acquisition request, from the app information memory unit 180 and returns the process flow information 1200A. With this, the process flow information 1200A illustrated in FIG. 9 is returned to the flow executing unit 131.

Next, after the flow executing unit 131 receives the process flow information 1200A, the flow executing unit 131 sends a component acquisition request to acquire the component to the component administering unit 132 in accordance with the process flow information 1200A (step S1702).

Said differently, the flow executing unit 131 sends the component acquisition request including the component ID "ocr", which is designated in the process content 1213A in the detailed flow 1203A of the process flow information 1200A, to the component administering unit 132.

After the component administering unit 132 receives the component acquisition request, the component administering unit 132 generates an OCR component 1333 corresponding to the component ID "ocr" included in the component acquisition request (step S1703). The OCR component 1333 can be generated using the API defined in the component common I/F 1330.

The component administering unit 132 returns the generated OCR component 1333 to the flow executing unit 131. Said differently, the component administering unit 132 returns the address in the memory (e.g., the RAM 14), on which the OCR component 1333 is deployed, to the flow executing unit 131.

Next, the flow executing unit 131 sends a process execution request to execute a process in accordance with the process flow information 1200A to the generated OCR component 1333 (step S1704).

Said differently, the flow executing unit 131 sends the process execution request including the data and the operation ID "process", which is designated in the process content 1213A in the detailed flow 1203A of the process flow information 1200A, to the OCR component 1333.

The data included in the process execution request are an electronic file received from the UI controlling unit 210 as a data type "InputStream".

Said differently, the flow executing unit 131 sends the electronic file received from the UI controlling unit 210 as the data type "InputStream" simply as "data" (without designating the data type) to the OCR component 1333. Referring to FIG. 17, this electronic file sent and received without designating the data type is simply indicated as the "data".

After the OCR component 1333 receives the process execution request, the OCR component 1333 requests the type conversion administering unit 134 to perform the type conversion (step S1705). Here, the type conversion request includes the data and a designation of "LocalFilePath" indicative of a data type, which can be treated by the OCR component 1333.

After the type conversion administering unit 134 receives the type conversion request, the type conversion administering unit 134 checks whether the data type of the data included in the above-received type conversion request matches the designated data type (step S1706).

Here, the data type of the data included in the received type conversion request is "InputStream" and the designated data type is "LocalFilePath". Accordingly, the type conversion administering unit 134 determines that the data type of the data included in the received type conversion request does not match the designated data type.

Then, the type conversion request 134 refers to the type-conversion information table 3000 and specifies a first type conversion 1351 for converting the data type "InputStream" to the data type "LocalFilePath". Then, the type conversion administering unit 134 generates the specified first type conversion 1351 (step S1707). The API defined in the type conversion common I/F 1350 is used to generate the first type conversion 1351.

Next, the type conversion administering unit 134 sends a type conversion process execution request to execute a type conversion process to the generated first type conversion 1351 (step S1708). This type conversion process execution request includes data.

After the first type conversion 1351 receives the type conversion process execution request, the first type conversion 1351 converts the data type of the data including this type conversion process execution request from "InputStream" to "LocalFilePath" (step S1709). The first type conversion 1351 returns the data that are provided with the type conversion.

After the type conversion administering unit 134 receives the data provided with the type conversion, the type conversion administering unit 134 sends the data provided with the type conversion to the OCR component 1333 (step S1710).

When the OCR component 1333 receives the data provided with the type conversion, the OCR component 1333 executes the process (step S1312). Said differently, the OCR component 1333 executes the OCR process is executed for the electronic file indicated by the data (i.e., a path or an address) of the data type "LocalFilePath".

More specifically, the OCR component 1333 requests to execute the process to the OCR process 161 of the document servicing unit 160, and the OCR process 161 executes the process to the electronic file.

The OCR component 1333 returns data indicative of the electronic file, which is provided with the OCR process, to the flow executing unit 131. The data to be returned by the OCR component 1333 are the path or address of the electronic file, which is provided with the OCR process.

Next, after the flow executing unit 131 receives the process flow information 1200A, the flow executing unit 131 sends a component acquisition request to acquire the component to the component administering unit 132 in accordance with the process flow information 1200A (step S1712).

Said differently, the flow executing unit 131 sends the component acquisition request including the component ID "ocr", which is designated in the process content 1213A in the detailed flow 1203A of the process flow information 1200A, to the component administering unit 132.

After the component administering unit 132 receives the component acquisition request, the component administering unit 132 generates the external storage A component corresponding to the component ID "storageA" included in the component acquisition request (step S1713). The API defined in the component common I/F 1330 is used to enable to generate the external storage A component 1331.

The component administering unit 132 returns the generated external storage A component 1331 to the flow executing unit 131. Said differently, the component administering unit 132 returns the address in the memory (e.g., the RAM 14), on which the external storage A component 1331 is deployed, to the flow executing unit 131, for example.

Next, the flow executing unit 131 sends a process execution request to execute a process in accordance with the process flow information 1200A to the generated external storage A component 1331 (step S1714).

Said differently, the flow executing unit 131 sends a process execution request including the data and the operation ID "uploadFile", which is designated in the process content 1223A in the detailed flow 1203A of the process flow information 1200A, to the external storage A component 1331.

The data included in the process execution request are data returned from the OCR component 1333 as a data type "LocalFilePath" (said differently, a path or an address indicative of the electronic file, which is provided with the OCR process).

After the external storage A component 1331 receives the process execution request, the external storage A component 1331 sends a type conversion request to the type conversion administering unit 134 (step S1715). Here, the type conversion request includes the data and a designation of "LocalFilePath" indicative of a data type, which can be treated by the external storage A component 1331.

After the type conversion administering unit 134 receives the type conversion request, the type conversion administering unit 134 checks whether the data type of the data included in the received type conversion request matches the designated data type (step S1716).

Here, the data type of the data included in the received type conversion request is "LocalFilePath" and the designated data type is also "LocalFilePath". Accordingly, the type conversion administering unit 134 determines that the data type of the data included in the received type conversion request matches the designated data type.

Then, the type conversion administering unit 134 sends the data included in the type conversion request to the external storage A component 1331 (step S1717). As described, when the data types are determined to match in checking the data type (the process of step S1716), the type conversion administering unit 134 does not generate a type conversion.

When the external storage A component 1331 receives the data from the type conversion administering unit 134, the external storage A component 1331 executes the process (step S1718). Said differently, the external storage A component 1331 delivers (uploads) the electronic file indicated by the received data to the folder having a folder name "FolderB" in the external storage A.

Specifically, the external storage A component 1331 applies the API "external storage name/process/folder" illustrated in FIG. 5A to the file processing unit 1711 of the external storage A collaboration unit 1701 to execute the process. Said differently, the external storage A component 1331 sends the data as, for example, "/storage-a/process/folder" to the file processing unit 1711.

With this, the electronic file (the electronic file generated by scanning is provided with the OCR process) having the file name "test" is stored in the folder having the folder name "FolderB" of the external storage A.

The external storage A component 1331 returns the data indicative of the processed result to the flow executing unit 131.

As described above, the service providing system 10 of the first embodiment can provide the service substantialized by the sequence of processes collaborating with the external storage to the apparatus 20. At this time, the service providing system 10 of the first embodiment combines at least one component in accordance with the process flow information 1200 to enable to execute the sequence of processes.

Second Embodiment

Next, the information processing system 1 of a second embodiment is described. The second embodiment differs from the first embodiment at a point that, in the registration process of the process flow, the process flow can be updated or deleted in addition to the registration (the addition) of the process flow. Hereinafter, portions having substantially the same functions as those of the first embodiment and portions performing the same processes as those of the first embodiment are designated by the same reference symbols as those of the first embodiment, and description of these portions is omitted.

<Detailed Process>

Figure 18:
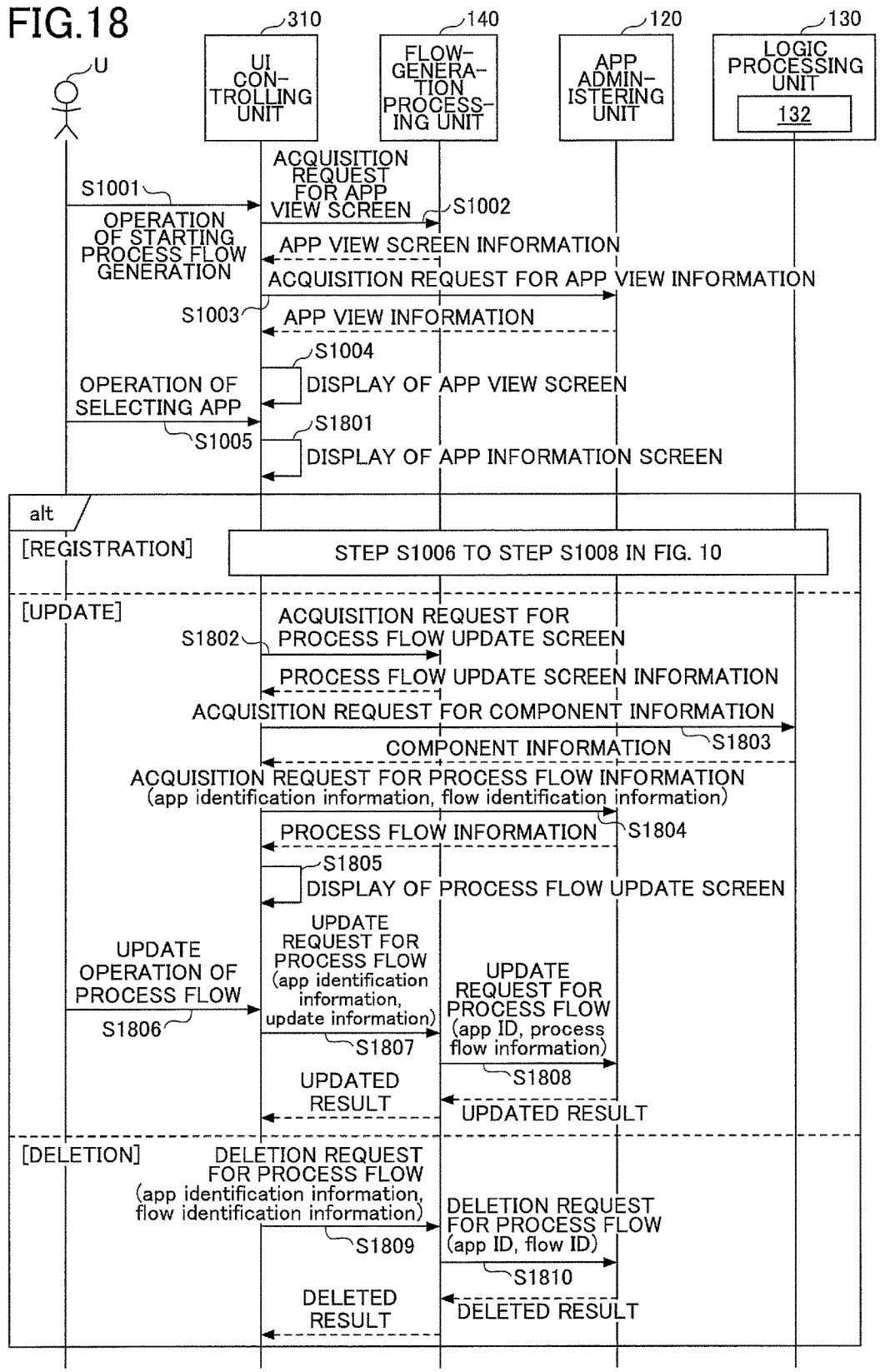
FIG. 18 is a sequence chart of an exemplary registration process for a process flow of a second embodiment.

Referring to FIG. 18, described below is a registration process for a process flow of the second embodiment. FIG. 18 is a sequence chart of an exemplary registration process for the process flow of the second embodiment.

After the UI controlling unit 310 of the PC terminal 30 receives a selection operation for an application of registering, updating, or deleting the process flow from the app name view 4001 of the app view screen 4000, the UI controlling unit 310 causes the app information screen of the selected application to be displayed (step S1801).

Figure 19:
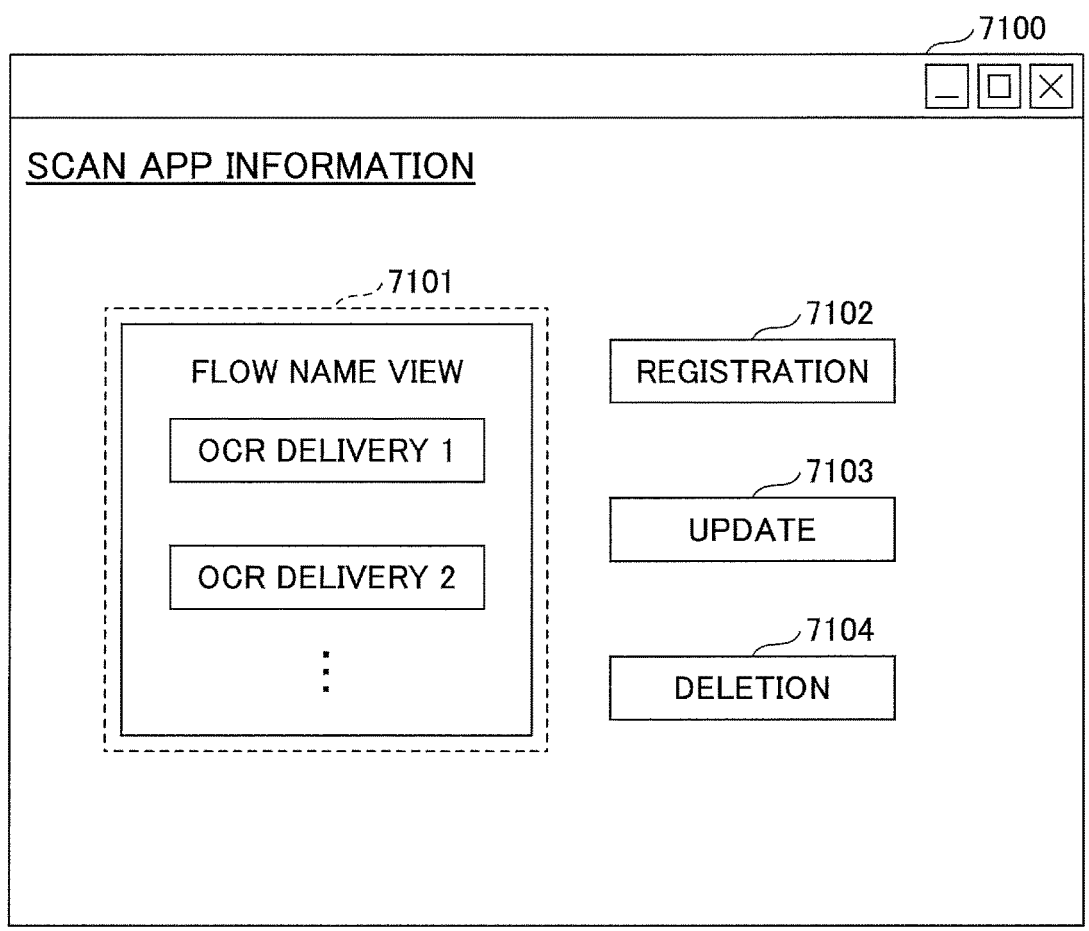
FIG. 19 illustrates an exemplary app information screen.

For example, in a case where "scan app" is selected from the app name view 4001 of the app view screen 4000 by the user U, the UI controlling unit 310 causes the display device 12 to display, for example, an app information screen 7100 illustrated in FIG. 19.

The app information screen 7100 illustrated in FIG. 19 is a screen for registering, updating, or deleting the process flow of the app information 1000A being "scan app".

The app information screen 7100 includes a flow name view 7101 that is a view of the process flow information 1200A included in the app information 1000A. Further, the app information screen 7100 includes a registration button 7102 for registering the process flow, an update button 7103 for updating the registered process flow, and a deletion button 7104 for deleting the registered process flow.

Hereinafter, a case where the registration button 7102 is selected by the user U, a case where the update button 7103 is selected by the user U, and a case where the deletion button 7104 is selected by the user U are respectively explained.

In a case where the registration button 7102 is selected by the user U on the app information screen 7100, processes similar to steps S1007 to S1008 in FIG. 10 are conducted. A detailed description of these processes is omitted.

Described below is a case where a flow name to be updated is selected by the user U from the flow name view 7101 on the app information screen 7100 and the update button 7103 is selected by the user U on the app information screen 7100. Described below is a case where "OCR delivery 1" is selected from the flow name view 7101 and thereafter the update button 7103 is selected.

After the UI controlling unit 310 of the PC terminal 30 receives a selection operation of selecting the update button 7103, the UI controlling unit 310 sends an acquisition request to acquire a process flow update screen to the flow-generation processing unit 140 (step S1802). The acquisition request includes the app ID "app001" of the app information 1000A selected from the app name view 4001 of the app view screen 4000 and the flow ID "flow001" of a process flow "OCR delivery 1", which is selected from the flow name view 7101 as an update target.

After the flow-generation processing unit 140 receives the acquisition request for the process flow update screen, the flow-generation processing unit 140 returns flow-generation processing unit 140 information corresponding to the flow ID included in this acquisition request.

After the UI controlling unit 310 of the PC terminal 30 receives the process flow update screen information, the UI controlling unit 310 sends an acquisition request to acquire the component information to the component administering unit 132 (step S1803). After the component administering unit 132 receives the acquisition request, the component administering unit 132 returns the component information stored in the component information table 2000.

Figure 20:
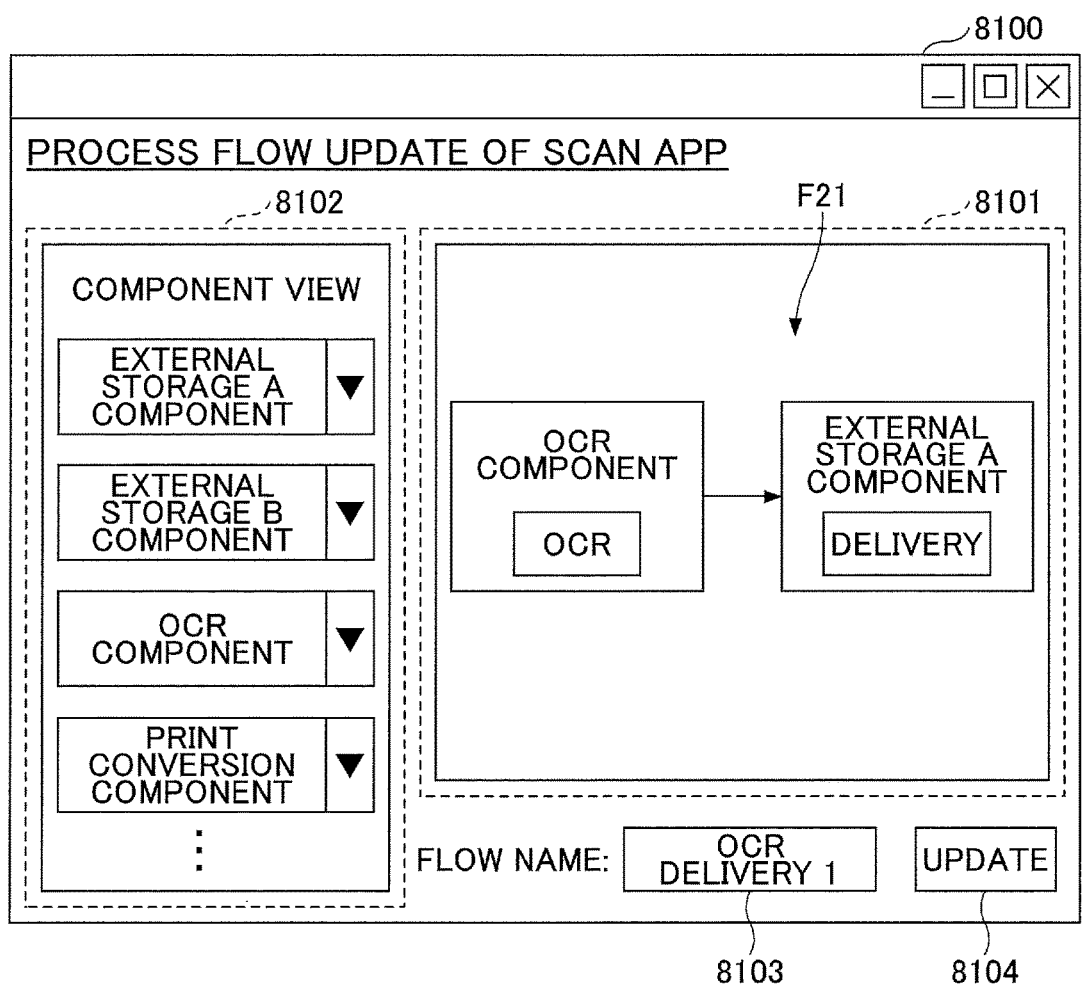
FIG. 20 illustrates an exemplary process flow update screen.

After the UI controlling unit 310 of the PC terminal 30 receives the component information, the UI controlling unit 310 reflects the component information in the process flow update screen to cause the display device 12 to display the process flow update screen 8100 illustrated in, for example, FIG. 20 (step S1805). Said differently, when the update button 7103 is selected on the app information screen 7100 while the process flow of the update target is selected from the flow name view 7101, the UI controlling unit 310 causes the app information screen 7100 to be transited to the process flow update screen 8100.

The process flow update screen 8100 is provided to generate the process flow of "OCR delivery 1" and includes a component view 8102, on which a component name view of the component names is displayed in accordance with the component information. The process flow update screen 8100 includes a generation area 8101 for updating the process flow F21 of "OCR delivery 1" selected by the user U. Further, the process flow update screen 8100 includes a flow name input column 8103 and an update button 8104 for confirming an update content.

Next, the user U conducts an operation of updating the process flow F21 on the process flow update screen 8100 (step S1806). The user U can update the process flow of the selected "OCR delivery 1" on the process flow update screen 8100 illustrated in FIG. 20 in a manner similar to the case where the process flow is generated. Said differently, the user U adds the process to the process flow F21 or deletes the process from the process flow F21 to enable the process flow F21 to be updated.

Next, after the user U updates the process flow F21, the UI controlling unit 310 of the PC terminal 30 sends an update request to update the process flow to the flow-generation processing unit 140 of the service providing system 10 (step S1807). The update request includes update information (e.g., identification information of the icon indicating the component and generated in the generation area and the icon indicating the operation and generated in the generation area, relevance information indicative of relevance between these icons, or the like) of the process flow F21 updated by the user U. Further, the update request includes information for identifying the scan app (e.g., information for identifying the process flow update screen 8100).

However, the UI controlling unit 310 may generate the process flow information 1200A indicative of the process flow F21 updated by the user U and the generated process flow information 1200A may be included in the registration update request and sent to the service providing system 10. Further, the UI controlling unit 310 may cause the update request to include the app ID "app001" of the scan app.

After the flow-generation processing unit 140 of the service providing system 10 receives the update request to update the process flow, the flow-generation processing unit 140 generates the process flow information 1200A indicative of the process flow F21 included in the update request in accordance with the update information of the process flow F21. The flow-generation processing unit 140 specifies the app ID "app001" of the app information 1000A of the scan app using information for identifying the scan app included in the update request.

The flow-generation processing unit 140 sends an update request to update the process flow including the process flow information 1200A and the app ID "app001" to the app administering unit 120 (step S1807). The flow-generation processing unit 140 may specify the app ID "app001" from the information for identifying the scan app in accordance with the process flow generation update information.

After the app administering unit 120 receives the update request to update the process flow, the app administering unit 120 causes the app information memory unit 180 to store the process flow information 1200A included in the update request while associating the process flow information 1200A with the app ID "app001" (step S1808). With this, the process flow information 1200A registered into the service providing system 10 is updated.

The app administering unit 120 returns an updated result indicating that the process flow information 1200A is updated through the flow-generation processing unit 1400 to the UI controlling unit 310.

Described below is a case where a flow name to be deleted is selected by the user U from the flow name view 7101 on the app information screen 7100 and the deletion button 7104 is selected by the user U on the app information screen 7100. Described below is a case where the deletion button 7104 is selected while "OCR delivery 2" is selected from the flow name view 7101.

After the UI controlling unit 310 of the PC terminal 30 receives a selection operation of selecting the deletion button 7104, the UI controlling unit 310 sends a deletion request to delete the process flow to the flow-generation processing unit 140 (step S1809). The acquisition request includes information (e.g., information for identifying each displaying part included in the app name view 4001) for identifying the application selected by the user U. The acquisition request includes information (e.g., information for identifying each displaying part included in the flow name view 7101) for identifying the application selected by the user U.

The UI controlling unit 310 may include the app ID "app001" of the application (the app information 1000A) selected by the user U and the flow ID "flow002" of the process flow "OCR delivery 2" as the deletion target in the process flow deletion request.

After the flow-generation processing unit 140 receives the process flow deletion request, the flow-generation processing unit 140 specifies the app ID "app001" and the flow ID "flow002" from information for identifying the application included in the deletion request and information for identifying the process flow as the deletion target.

The flow-generation processing unit 140 sends the deletion request to delete the process flow including the app ID "app001" and the flow ID "flow002" to the app administering unit 120 (step S1810).

After the app administering unit 120 receives the deletion request to delete the process flow, the app administering unit 120 causes the app information memory unit 180 to delete the process flow information 1200, which is indicated by the app ID "app001" and the flow ID "flow002". Then, the app administering unit 120 returns the deleted result through the flow-generation processing unit 140.

As described above, the information processing system 1 can update and delete the process flow registered in the service providing system 10.

Third Embodiment

Next, the information processing system 1 of a third embodiment is described. The third embodiment differs from the first embodiment at a point that the process flow can be generated and registered in the third embodiment using the natural language. Hereinafter, portions having substantially the same functions as those of the first embodiment and portions performing the same processes as those of the first embodiment are designated by the same reference symbols as those of the first embodiment, and description of these portions is omitted.

<Detailed Process>

Figure 21:
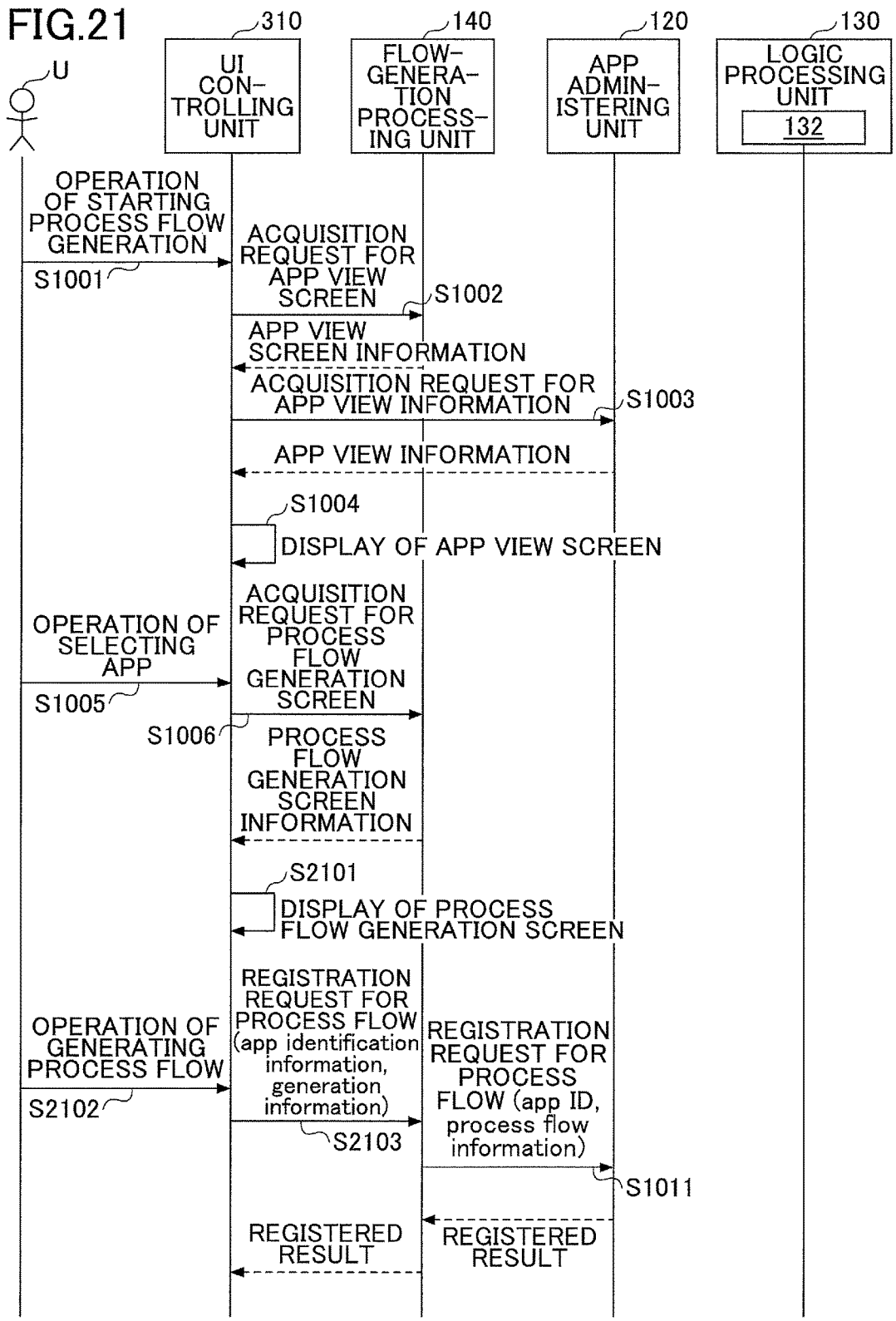
FIG. 21 is a sequence chart of an exemplary registration process for a process flow of a third embodiment.

Referring to FIG. 21, described below is a registration process for a process flow of the third embodiment. FIG. 21 is a sequence chart of an exemplary registration process for the process flow of the third embodiment.

Figure 22:
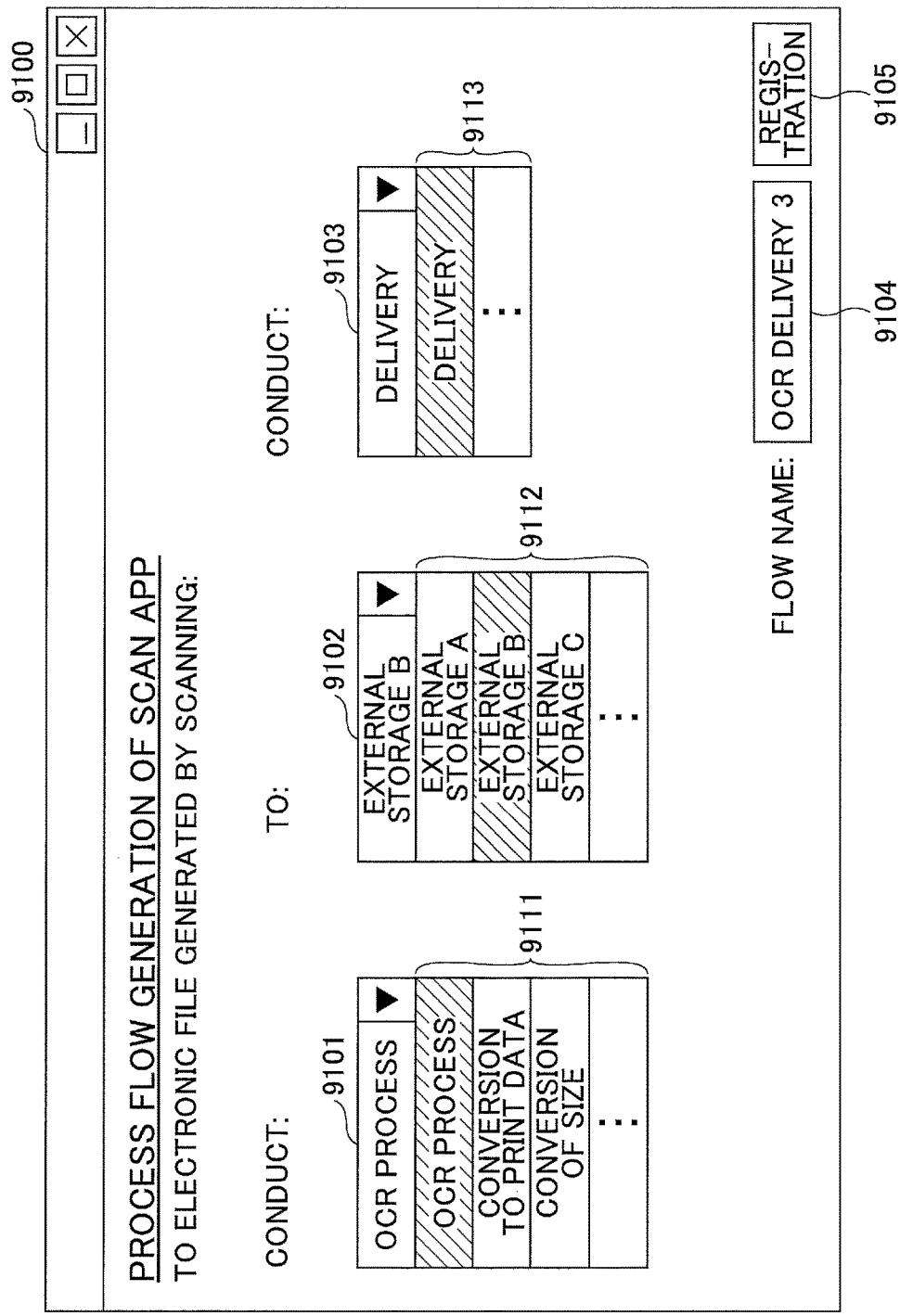
FIG. 22 illustrates another exemplary process flow generation screen.

When the UI controlling unit 310 of the PC terminal 30 receives the process flow generation screen information, the UI controlling unit 310 causes the display device 12 to display the process flow generation screen 9100 illustrated in, for example, FIG. 22 (step S2101).

The process flow generation screen 9100 illustrated in FIG. 22 is a screen for generating a process flow for the scan app and includes selection columns 9101 to 9103 of the natural language. The process flow generation screen 9100 includes a flow name input column 9104 for designating the flow name of the process flow and a registration button 9105 for registering the process flow.

The user U conducts an operation of generating the process flow of the scan app on the process flow generation screen 9100 (step S2102).

In the process flow generation screen 9100, the user U selects the desired natural language from the selection columns 9101 to 9103 of the natural language to enable to generate the process flow.

For example, the user U selects the desired selection element from a selection element view 9111 of the selection column 9101 of the natural language. Similarly, the user U selects desired selection elements from selection element views 9112 and 9113 in selection columns 9112 and 9113 of the natural language, respectively.

Within the third embodiment, the process flow can be generated when the user U selects the desired natural language.

Described below is a case where "OCR process", "external storage", and "delivery" are respectively selected in selection columns 9101 to 9103 of the natural language, for example. After the UI controlling unit 310 provides the OCR process to the electronic file generated by scanning in the apparatus 20, the UI controlling unit 310 generates the process flow information 1200 used to deliver the electronic file to the external storage B.

In the process flow generation screen 9100 illustrated in FIG. 22, three selection columns 9101 to 9103 of the natural language are included. However, the third embodiment is not limited thereto, and the number of the selection columns of the natural language may be arbitrarily determined.

The user U inputs the desired flow name into the flow name input column 9104 and selects the registration button 9105 to generate the process flow.

After the process flow is generated by the user U, the UI controlling unit 310 of the PC terminal 30 sends a process flow registration request to register the process flow to the flow-generation processing unit 140 (step S2103). The registration request includes generation information of the process flow generated by the user U and information for identifying the scan app.

As described, the information processing system 1 of the third embodiment can cause the service providing system 10 to store the process flow information 1200 indicative of the process flow generated by the user.

In the information processing system 1 of the third embodiment, the user selects the natural languages and combines the selected natural languages to generate the process flow. Therefore, the user can easily generate the process flow.

Fourth Embodiment

Next, the information processing system 1 of a fourth embodiment is described. The fourth embodiment differs from the first embodiment at an acquisition method of acquiring various information for causing the screen to be displayed in the registration process for the process flow. Hereinafter, portions having substantially the same functions as those of the first embodiment and portions performing the same processes as those of the first embodiment are designated by the same reference symbols as those of the first embodiment, and description of these portions is omitted.

<Functional Structure>

Figure 23:
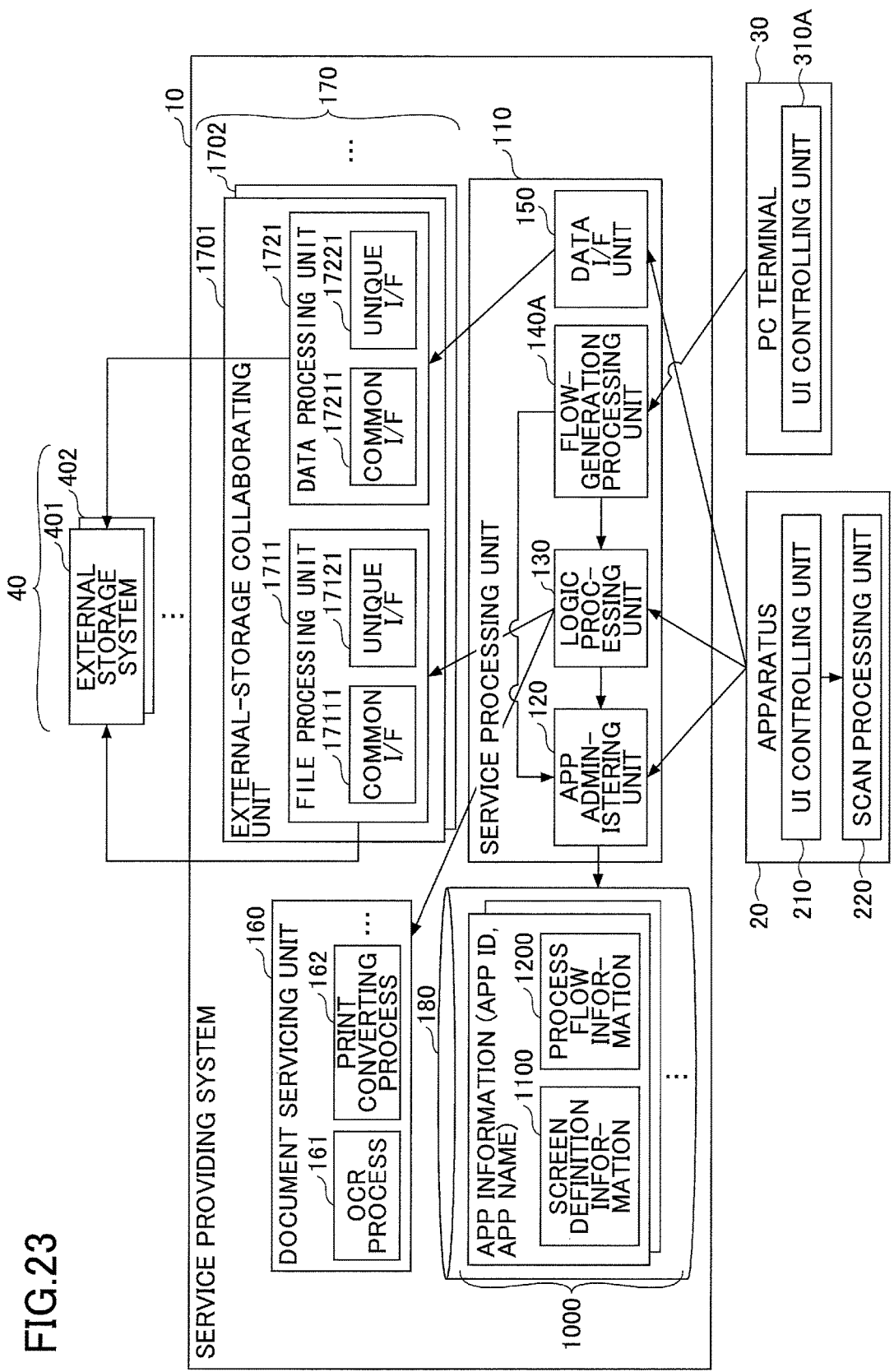
FIG. 23 is a diagram illustrating a functional structure of an exemplary information processing system of a fourth embodiment.

Referring to FIG. 23, a functional structure of the information processing system 1 of the fourth embodiment is described. FIG. 23 is a diagram illustrating the functional structure of an exemplary information processing system of the fourth embodiment.

The PC terminal 30 of the fourth embodiment includes a UI controlling unit 310A. The UI controlling unit 310A causes the operation panel 22 to display various screens. At this time, the UI controlling unit 310A acquires various information for causing the various screens to be displayed from the flow-generation processing unit 140A. The UI controlling unit 310A differs from the first embodiment in that the app view information and the component information are not directly acquired from the app administering unit 120 and the logic processing unit 130.

The service providing system 10 of the fourth embodiment includes a flow-generation processing unit 140A. The flow-generation processing unit 140A acquires the app view information and the component information from the app administering unit 120 and the logic processing unit 130.

<Detailed Process>

Referring to FIG. 24, described below is a registration process for a process flow of the fourth embodiment. FIG. 24 is a sequence chart of an exemplary registration process for the process flow of the fourth embodiment.

After the flow-generation processing unit 140A of the service providing system 10 receives an app view screen acquisition request to acquire an app view screen, the flow-generation processing unit 140A sends an app view information acquisition request to acquire app view information to the app administering unit 120 (step S2401). After the app administering unit 120 receives the app view information acquisition request, the app administering unit 120 returns the app view information to the flow-generation processing unit 140A. Thereafter, the flow-generation processing unit 140A returns the app view screen information together with the app view information returned from the app administering unit 120 to the UI controlling unit 310A.

After the flow-generation processing unit 140A of the service providing system 10 receives a flow generation screen acquisition request to acquire a flow generation screen, the flow-generation processing unit 140A sends a component information acquisition request to acquire component information to the component administering unit 132 (step S2402). After the component administering unit 132 receives the component information acquisition request, the component administering unit 132 returns the component information stored in the component information table 2000 to flow-generation processing unit 140A. Thereafter, the flow-generation processing unit 140A returns the process flow generation screen information together with the component information returned from the component administering unit 132 to the UI controlling unit 310A.

As described above, when the app view screen or the process flow generation screen is displayed on the PC terminal 30 in the registration process for the process flow in the information processing system 1 of the fourth embodiment, the number of communications between the PC terminal 30 and the service providing system 10 can be reduced.

According to the embodiment of the present invention, it is possible to support development of an application for conducting a sequence of processes.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system including at least one information processing apparatus that executes a plurality of programs, each of the programs performing a predetermined process and that is coupled to at least one apparatus, the information processing apparatus:
   a memory configured to store
      program identification information identifying at least one program from among the plurality of programs that performs each process of the sequence of processes,
      flow information defining an execution order of the at least one program, and
      app identification information identifying each application from among the one or more applications,
   for one or more applications that perform a sequence of processes using electronic data, wherein the program identification information, the flow information, and the app identification information are stored in association with each other; and
   a processor that executes program instructions stored in the memory to
      receive a selection of a selected application from among the one or more applications by a user on a first screen displayed at a first apparatus from among the at least one apparatus coupled to the information processing system,
      generate flow information of the sequence of processes to be executed by the selected application using the program identification information and a user operation for defining the execution order,
      associate the generated flow information and the app identification information,
      store the generated flow information and the app identification information for identifying the selected application that have been associated with each other in the memory,
      convert the electronic data to a predetermined data type, which can be accessed by the program corresponding to the selected application, and
      execute the program from among the plurality of programs after converting to the data type, to perform the sequence of processes using the electronic data, and
      perform the sequence of processes based on the information related to the electronic data of the program identified by the program identification information and in accordance with the execution order as defined in the flow information upon receipt of a request including information related to the electronic data used for the sequence of processes and the app identification information from a second apparatus from among the at least one apparatus.

2. The information processing system according to claim 1, wherein the execution of the program instructions further causes the processor to:
   update the program identification information defined in the flow information stored in the memory unit in association with the app identification information of the selected application, and
   update the execution order,
   in response to a user operation on a second screen displayed on the first apparatus to change the program identification information of the sequence of processes performed by the selected application, and to change the execution order.

3. The information processing system according to claim 1,
   wherein the execution of the program instructions further causes the processor to:
      delete the flow information stored in the memory in association with the app identification information identifying the selected application in response to a user operation on a third screen displayed on the first apparatus to delete the flow information of the sequence of processes performed by the selected application.

4. The information processing system according to claim 1, wherein
   the plurality of programs includes a program executing a process for an external service, and
   the program executing the process for the external service includes a program executing a process of uploading the electronic data to the external service.

5. A method for processing information used in an information processing system including at least one information processing apparatus that executes a plurality of programs, each of the programs performing a predetermined process, and that is coupled to at least one apparatus, the method for processing information comprising:
   storing, for one or more applications that perform a sequence of processes using electronic data,
      program identification information identifying at least one program from among the plurality of programs that performs each process of the sequence of processes,
      flow information defining an execution order of the at least one program, and
      app identification information identifying each application from among the one or more applications,
   for one or more application that perform a sequence of processes using electronic data, wherein the program identification information, the flow information, and the app identification information are stored in association with each other;
   receiving a selection of a selected application from among the one or more application by a user on a first screen displayed at a first apparatus from among the at least one apparatus coupled to the information processing system;
   generating flow information of the sequence of processes to be executed by the selected application using the program identification information and a user operation for defining the execution order;
   associating the generated flow information and the app identification information,
   storing the generated flow information and the app identification information for identifying the selected application that have been associated with each other in the memory;
   convert the electronic data to a predetermined data type, which can be accessed by the program corresponding to the selected application;

execute the program from among the plurality of programs after converting to the data type, to perform the sequence of processes using the electronic data; and performing the sequence of processes based on the information related to the electronic data of the program identified by the program identification information and in accordance with the execution order as defined in the flow information upon receipt of a request including information related to the electronic data used for the sequence of processes and the app identification information from a second apparatus from among the at least one apparatus.

6. A non-transitory computer-readable storage medium storing program instructions that cause an information processing apparatus that executes a plurality of programs, each of the programs performing a predetermined process, and that is coupled to at least one apparatus, to execute an information processing method comprising:

storing, for one or more applications that perform a sequence of processes using electronic data, program identification information identifying at least one program from among the plurality of programs that performs each process of the sequence of processes, flow information defining an execution order of the at least one program, and app identification information identifying each application from among the one or more applications, for one or more application that perform a sequence of processes using electronic data, wherein the program identification information, the flow information, and the app identification information are stored in association with each other;

receiving a selection of a selected application from among the one or more application by a user on a first screen displayed at a first apparatus from among the at least one apparatus coupled to the information processing system;

generating flow information of the sequence of processes to be executed by the selected application using the program identification information and a user operation for defining the execution order;

associating the generated flow information and the app identification information, storing the generated flow information and the app identification information for identifying the selected application that have been associated with each other in the memory;

convert the electronic data to a predetermined data type that can be accessed by the program corresponding to the selected application;

execute the program from among the plurality of programs after converting to the data type, to perform the sequence of processes using the electronic data; and performing the sequence of processes based on the information related to the electronic data of the program identified by the program identification information and in accordance with the execution order as defined in the flow information upon receipt of a request including information related to the electronic data used for the sequence of processes and the app identification information from a second apparatus from among the at least one apparatus.

* * * * *